(12) United States Patent
Kaufman et al.

(10) Patent No.: US 6,332,185 B1
(45) Date of Patent: *Dec. 18, 2001

(54) METHOD AND APPARATUS FOR PAGING DATA AND ATTRIBUTES INCLUDING AN ATOMIC ATTRIBUTE FOR DIGITAL DATA PROCESSOR

(75) Inventors: Mark A. Kaufman, Brighton; Fernando Oliveira, Framingham, both of MA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/461,174

(22) Filed: Jun. 5, 1995

Related U.S. Application Data

(63) Continuation of application No. 07/763,368, filed on Sep. 20, 1991, now abandoned.

(51) Int. Cl.[7] .............................. G06F 12/06; G06F 13/00

(52) U.S. Cl. ........................... 711/209; 711/217; 711/156

(58) Field of Search .................................... 395/401, 404, 395/406, 419, 444, 474, 479, 480, 481, 483, 490; 711/1, 4, 6, 209, 117, 147, 152, 153, 154, 156, 163, 217

(56) References Cited

U.S. PATENT DOCUMENTS

| Re. 28,811 | 5/1976 | Pierce ................................. 370/405 |
|---|---|---|
| 3,713,096 | 1/1973 | Comfort et al. ..................... 709/251 |
| 3,723,946 | 3/1973 | Alvarez et al. ...................... 711/207 |
| 3,731,002 | 5/1973 | Pierce ................................... 370/237 |
| 3,735,362 | 5/1973 | Ashany et al. ....................... 710/130 |
| 3,748,647 | 7/1973 | Ashany et al. ....................... 710/130 |
| 3,800,291 | 3/1974 | Cocke et al. ........................ 711/202 |
| 4,011,545 | 3/1977 | Nadir .................................. 709/200 |

(List continued on next page.)

FOREIGN PATENT DOCUMENTS

| 0014926 | 2/1980 | (EP) . |
| 0233993 | 4/1982 | (EP) . |
| 0214718 | 3/1987 | (EP) . |

(List continued on next page.)

OTHER PUBLICATIONS

MCS–80/85 Family User's Manual, Intel Corp., Oct. 1979.
Titus, 8080/8085 Software Design (Date Unknown).

(List continued on next page.)

Primary Examiner—Glenn Gossage
(74) Attorney, Agent, or Firm—Conley, Rose & Tayon, PC; B. Noël Kivlin

(57) ABSTRACT

A digital data processing apparatus has a primary data storage element that stores data for access by one or more processes, as well as a secondary data storage element, e.g., a disk drive, for non-volatile data storage. A paging mechanism selectively transfers sets of data between the primary data storage element and an associated data file on the secondary data storage element. A directory stores "atomic" signals, or bits, each reflecting a state of one or more subsets of data in respective sets. The paging mechanism includes a page-out element that stores data from a subset of a set to the associated data file. During paging, the page-out element responds to data in the subset which are associated with the atomic state (as indicated by the atomic bit) for storing to an associated status file on the secondary data storage element attributes of the paged data. Those signals can be, for example, the atomic bits themselves.

36 Claims, 14 Drawing Sheets

U.S. PATENT DOCUMENTS

| | | | |
|---|---|---|---|
| 4,031,512 | 6/1977 | Faber | 340/825.2 |
| 4,077,059 | 2/1978 | Cordi et al. | 711/122 |
| 4,141,067 | 2/1979 | McLagan | 711/141 |
| 4,240,143 | 12/1980 | Besemer et al. | 710/104 |
| 4,245,306 | 1/1981 | Besemer et al. | 709/245 |
| 4,293,910 | 10/1981 | Flusche et al. | 711/157 |
| 4,322,795 | 3/1982 | Lange et al. | 711/136 |
| 4,334,305 | 6/1982 | Girardi | 370/359 |
| 4,394,731 | 7/1983 | Flusche et al. | 711/145 |
| 4,410,944 | 10/1983 | Kronies | 711/147 |
| 4,410,946 | 10/1983 | Spencer | 711/137 |
| 4,432,057 | 2/1984 | Daniell et al. | 707/8 |
| 4,468,733 | 8/1984 | Oka et al. | 710/126 |
| 4,476,524 * | 10/1984 | Brown et al. | 710/126 |
| 4,484,262 | 11/1984 | Sullivan et al. | 711/216 |
| 4,488,256 | 12/1984 | Zolnowsky et al. | 711/210 |
| 4,503,497 | 3/1985 | Krygowski et al. | 711/124 |
| 4,510,492 | 4/1985 | Mori et al. | 370/403 |
| 4,598,400 | 7/1986 | Hillis | 370/400 |
| 4,604,694 | 8/1986 | Hough | 710/200 |
| 4,622,631 | 11/1986 | Frank et al. | 707/201 |
| 4,625,081 | 11/1986 | Lotito et al. | 379/88.26 |
| 4,646,271 | 2/1987 | Uchiyama et al. | 365/49 |
| 4,700,347 | 10/1987 | Rettberg et al. | 714/700 |
| 4,701,756 | 10/1987 | Burr | 340/825.02 |
| 4,706,080 | 11/1987 | Sincoskie | 340/825.02 |
| 4,714,990 | 12/1987 | Desyllas et al. | 711/3 |
| 4,730,249 | 3/1988 | O'Quin, II et al. | 709/100 |
| 4,734,907 | 3/1988 | Turner | 370/390 |
| 4,754,394 | 6/1988 | Brantley, Jr. et al. | 711/5 |
| 4,768,144 | 8/1988 | Winter et al. | 707/1 |
| 4,780,873 | 10/1988 | Mattheyses | 370/360 |
| 4,797,880 | 1/1989 | Bussey, Jr. et al. | 370/411 |
| 4,811,009 | 3/1989 | Orimo et al. | 370/403 |
| 4,814,970 | 3/1989 | Barbagelata et al. | 712/28 |
| 4,829,227 | 5/1989 | Turner | 370/422 |
| 4,845,702 | 7/1989 | Melindo | 359/135 |
| 4,885,742 | 12/1989 | Yano | 370/408 |
| 4,928,224 | 5/1990 | Zulian | 710/129 |
| 4,930,106 | 5/1990 | Danilenko et al. | 365/189.01 |
| 4,951,193 | 8/1990 | Muramatsu et al. | 711/206 |
| 4,984,235 | 1/1991 | Hillis et al. | 370/392 |
| 5,006,978 | 4/1991 | Neches | 709/102 |
| 5,025,365 | 6/1991 | Mathur et al. | 711/121 |
| 5,025,366 | 6/1991 | Baror | 711/128 |
| 5,055,999 * | 10/1991 | Frank et al. | 711/163 |
| 5,067,071 | 11/1991 | Schanin et al. | 710/113 |
| 5,101,485 * | 3/1992 | Perazzoli, Jr. | 711/206 |
| 5,119,481 | 6/1992 | Frank et al. | 710/100 |
| 5,136,717 | 8/1992 | Morley et al. | 712/16 |
| 5,212,773 | 5/1993 | Hillis | 709/243 |
| 5,226,039 * | 7/1993 | Frank et al. | 370/405 |
| 5,226,109 | 7/1993 | Dawson et al. | 345/420 |
| 5,226,175 | 7/1993 | Deutsch et al. | 345/419 |
| 5,251,308 | 10/1993 | Frank et al. | 711/163 |
| 5,282,201 | 1/1994 | Frank et al. | 370/403 |
| 5,297,265 | 3/1994 | Frank et al. | 711/202 |

FOREIGN PATENT DOCUMENTS

| | | |
|---|---|---|
| 0 229 691 | 7/1987 | (EP) . |
| 0229932 | 7/1987 | (EP) . |
| 0273612 | 7/1987 | (EP) . |
| 0233993 | 9/1987 | (EP) . |
| 262750 | 4/1988 | (EP) . |
| 0 278 315 | 8/1988 | (EP) . |
| 0332818 | 1/1989 | (EP) . |
| 0312194 | 4/1989 | (EP) . |
| 0322117 | 6/1989 | (EP) . |
| 322116 | 6/1989 | (EP) . |
| 404559 | 12/1990 | (EP) . |
| 404560 | 12/1990 | (EP) . |
| 0 432 075 | 6/1991 | (EP) . |
| 2065941 | 7/1981 | (GB) . |
| 2178205 | 2/1987 | (GB) . |
| 2176918 | 1/1997 | (GB) . |
| 59-103166 | 6/1984 | (JP) . |
| 8808652 | 11/1988 | (WO) . |
| 8909446 | 10/1989 | (WO) . |
| 9000283 | 1/1990 | (WO) . |

OTHER PUBLICATIONS

Fuller et al, "Multi–Microprocessors: an Overview and Working Example" Proceedings of the IEEE, vol. 66, No. 2, Feb. 1978, pp. 216–228.

Swan et al, "Cm*—A Modular Multi–Microprocessor," Nat'l Comp Confr. 1977, pp. 637–644.

Lovett et al., Proc. '88 Int'l. Conf. on Parallel Processing, vol. 1, Penn State Univ. Press (Aug. 15–19, 1988) p. 303 et seq.

Kai Li et al., Proc. '89 Int'l. Conf. on Parallel Processing, Penn State Univ. Press (Aug. 8–12, 1989) p. I–125 et seq.

Papamarcos et al., Proc. of 11th Annual Symposium on Computer Archit. (Jun. 5–7, 1984) p. 348 et seq. (IEEE).

"High Performance/High Availability Interprocessor . . . ", IBM Tech. Disclosure Bul., vol. 31, No. 2 (Jul. 1988) pp. 41–42.

Schwartz, Telecommunications Network, "Introduction & Overview" pp. 1–20, "Layered Architecture in Data Networks" pp. 71–117.

Haridi et al., "The Cache Coherence Protocol of the Data Diffusion Machine" Parallel Archit. Proc., vol. 1, pp. 1–18 (1989).

Warren et al., "Data Diffusion Machine—A Scalable . . . ", Proc. Int'l Conf. on Fifth . . . (1988) pp. 943–952.

Hagersten, "Some Issues on Cache–Only Memory Architecture," Scalable Shared–Memory Multiprocessors (May 1990) p. 12.

Hagersten et al. "The Data Diffusion Machine and its Data Coherency Protocols", Proc. of the IFIP, (1990) pp. 127–148.

Ciepielewsik et al., "A Formal Model for Or–Parallel . . . ", Proc. of the IFIP 9th World Computer Congress (1983) pp. 299–305.

Censier et al., "A New Solution to Coherence . . . ", IEEE Transaction on Computers, vol. c–27, No, 12 (Dec. 1978) pp. 1112–1118.

Eggers et al., "Evaluating the Performance of Four . . . ", Proc. of the 16th Annual Int'l Symposium on Computer Archit. (1989) pp. 2–15.

Gehringer et al., "The Cm* Hardware Architecture", Parallel Proc. the Cm* Experience, Digital Press, pp. 11–28, 432, 438.

Goodman et al., "The Wisconsin Multicube: A New . . . ", Proc. of the 15th Annual Int'l Symposium on Computer Archit. (1988) pp. 422–431.

Hagersten et al., "The Cache Coherence Protocol of the . . .", Cache & Interconnect Archit. in Multiproc., Klewer Acad. Pub. (1990) pp. 165–188.

Mizrahi et al., "Introducing Memory into the Switch . . . ", Proc. of the 16th Annual Int'l Symposium on Computer Archit. (1989) pp. 158–166.

Pfister et al., "The IBM Research Parallel Processor . . . ", IEEE Proc. of the 1985 Int'l Conf. on Parallel Proc. (1985) pp. 764–771.

Tabak, "Chapter B Bus–Oriented Ssytems", Multiprocessors, Prentice Hall (1990) pp. 92–102.

Wilson, Sr. Editor, "Increased CPU Speed Drives Changes in Multiprocessor Cache and Bus Designs", Computer Design, (Jun. 1987) p. 20.

Ali et al., "Global Garbage Collection for Distributed . . . ", Int'l Jo. of Parallel Programming, vol. 15, No. 5 (1986) pp. 339–387.

* cited by examiner

METHOD AND APPARATUS FOR PAGING DATA AND ATTRIBUTES INCLUDING AN ATOMIC ATTRIBUTE FOR DIGITAL DATA PROCESSOR

This is a Continuation of copending, commonly assigned U.S. patent application Ser. No. 07/763,368 filed on Sep. 20, 1991 Entitled: DIGITAL DATA PROCESSOR WITH IMPROVED PAGING, now abandoned.

CROSS REFERENCE TO RELATED APPLICATIONS

This application is related to the following co-pending and commonly assigned applications, the teachings of which are incorporated herein by reference:

1) U.S. patent application Ser. No. 07/136,930, filed Dec. 22, 1987, for "MULTIPROCESSOR DIGITAL DATA PROCESSING SYSTEM", now U.S. Pat. No. 5,055,999 issued Oct. 8, 1991;

2) U.S. patent application Ser. No. 07/696,291, filed May 20, 1991 (which is a continuation of U.S. patent application Ser. No. 07/509,480, filed Apr. 13, 1990, now abandoned, which is a continuation of U.S. patent application Ser. No. 07/136,701, filed Dec. 22, 1987, now abandoned), now U.S. Pat. No. 5,119,481, issued Jun. 2, 1992;

3) U.S. patent application Ser. No. 07/370,325, filed Jun. 22, 1989, for "MULTIPROCESSOR SYSTEM WITH MULTIPLE INSTRUCTION SOURCES," (a continuation-in-part of U.S. patent application Ser. No. 136,930, filed Dec. 22, 1987, now U.S. Pat. No. 5,055,999), now abandoned in favor of U.S. patent appn. Ser. No. 08/066,334, filed May 21, 1993, now abandoned in favor of Appn. Ser. No. 08/461,166, now U.S. Pat. No. 5,822,578.

4) U.S. patent application Ser. No. 370,341, filed Jun. 22, 1989, for "IMPROVED MEMORY SYSTEM FOR A MULTIPROCESSOR," (a continuation of U.S. patent application Ser. No. 136,930, filed Dec. 22, 1987, now U.S. Pat. No. 5,055,999), now U.S. Pat. No. 5,297,265 issued Mar. 22, 1994.

5) U.S. patent application Ser. No. 07/370,287 (Attorney Docket No. KSP-007CP), filed Jun. 22, 1989, for "IMPROVED MULTIPROCESSOR SYSTEM," (a continuation-in-part of U.S. patent application Ser. No. 136,930, filed Dec. 22, 1987, now U.S Pat. No. 5,055,999), now U.S. Pat. No. 5,251,308, issued Oct. 5, 1993;

6) U.S. patent application Ser. No. 07/499,182, filed Mar. 26, 1990, for "HIGH-SPEED PACKET SWITCHING APPARATUS AND METHOD," (a continuation-in-part of U.S. patent application Ser. No. 136,930, filed Dec. 22, 1987, now U.S. Pat. No. 5,055,999), now U.S. Pat. No. 5,335,325, issued Aug. 2, 1994;

7) U.S. patent application Ser. No. 07/521,798, filed May 10, 1990, for "DYNAMIC PACKET ROUTING NETWORK," (a continuation-in-part of U.S. patent application Ser. No. 136,930, filed Dec. 22, 1987, U.S. Pat. No. 5,055,999 U.S. patent application Ser. No. 509,480, filed Apr. 13, 1990, now abandoned in favor of Appn. Ser. No. 07/696,291 discussed above, and U.S. patent application Ser. No. 370,325, filed Jun. 22, 1989, U.S. patent application Ser. No. 370,341, filed Jun. 22, 1989, U.S. patent application No. 370,287, filed Jun. 22, 1989, U.S. patent application Ser. No. 499,182, filed Mar. 26, 1990, all also discussed above), now U.S. Pat. No. 5,282,201, issued Jan. 25, 1994;

8) U.S. patent application Ser. No. 07/526,396, filed May 18, 1990, for "PACKET ROUTING SWITCH," (a continuation-in-part of U.S. patent application Ser. No. 521,798, filed May 10, 1990, U.S. patent application Ser. No. 136,930, filed Dec. 22, 1987, U.S. patent application Ser. No. 509,480, filed Apr. 13, 1990, U.S. patent application Ser. No. 370,325, filed Jun. 22, 1989, U.S. patent application Ser. No. 370,341, filed Jun. 22, 1989, U.S. patent application Ser. No. 370,287, filed Jun. 22, 1989, U.S. patent application Ser. No. 499,182, filed Mar. 26, 1990, all discussed above), now U.S. Pat. No. 5,226,039, issued Jul. 6, 1993;

9) U.S. patent application Ser. No. 07/531,506, filed May 31, 1990, for "DYNAMIC HIERARCHICAL ASSOCIATIVE MEMORY," (a continuation-in-part of U.S. patent application Ser. No. 136,930, filed Dec. 22, 1987, U.S. patent application Ser. No. 136,701, filed Dec. 22, 1987, now abandoned in favor of U.S. patent application Ser. No. 509,480, filed Apr. 13, 1990, U.S. patent application Ser. No. 370,325, filed Jun. 22, 1989, U.S. patent application Ser. No. 370,341, filed Jun. 22, 1989, U.S. patent application Ser. No. 370,287, filed Jun. 22, 1989, U.S. patent application Ser. No. 499,182, filed Mar. 26, 1990, U.S. patent application Ser. No. 521,798, filed May 10, 1990, all discussed above), now U.S. Pat. No. 5,341,483, issued Aug. 23, 1994.

BACKGROUND OF THE INVENTION

This invention relates to digital data processing and, more particularly, to paging data and related information to and from secondary storage devices.

High-speed physical storage space on computer systems is limited. Programs that run on those systems often require access to more data than that which can fit into the high-speed stores, referred to as random access memory, or RAM. Sometimes the programs themselves—not just the data they process—consume more memory than available on the system.

Early programs managed excess data by moving it directly between memory and secondary storage devices, e.g., magnetic disk drives, as needed. This required little memory—just the space needed to store the data currently being processed—but slowed processing by requiring frequent disk accesses. Some gains were obtained by accessing data in blocks, reading large amounts of data from disk into arrays, processing those arrays, then writing them back out to disk.

With the advent of virtual memory management systems, data management functions have been taken over by the computer operating system software. Programs written for use with these systems reference large amounts of data as if it were stored entirely in memory. Often it is not: the virtual memory system itself moves data back and forth between physical memory and disk.

Conventional operating systems, while effective for paging data per se, do not effectively retain "out of band" information. That is, information that pertains to the data, but which is not stored in logical memory structures common to it.

This is of particular concern in paging data within a multiprocessor systems of the type disclosed by Frank et al, U.S. patent application Ser. No. 136,930, filed Dec. 22, 1987, now U.S. Pat. No. 5,055,999, issued Oct. 8, 1991. There a digital data processing system comprises a plurality of processing cells, each including a central processing unit and a memory element, arranged in a hierarchy of rings. The memory elements can each include a directory element that maintains a list of descriptors reflecting the identity and state of each datum stored in the corresponding memory. While one portion of each descriptor "identifies" the associated datum (e.g., providing its system address), the other portion represents the datum's access state, governing the manner in which the local central processing unit (and the other processing cells) may utilize the datum.

One access state utilized in the disclosed system is the "atomic" state. A datum in that state can only be accessed by the owning central processing unit. All other cells are prohibited from accessing the datum until it is released by its owner. Because the atomic state information, in particular, and the descriptor information, in general, is retained separately from the associated datum, that information is considered to be out-of-band.

While the Frank et al system provides data movement and paging mechanisms, still further advances in this area are desirable. In view of the foregoing, an object of this invention is to provide an improved digital data processing system.

More particularly, an object is to provide an improved apparatus and method for paging data that is associated with out-of-band information.

Still another object is to provide an improved system of the type described above operating under UNIX™ or a UNIX-like operating system.

A further object is to provide a computer operating system having a paging mechanism the effectively handles attributes reflecting that data is associated with a specific processors and cannot be accessed by the other processors.

SUMMARY OF THE INVENTION

These and other objects are attained by the invention, which provides in one aspect a digital data processing system that transfers out-of-band information to and from a status file when paging data to a data file. The invention has applicability, inter alia, in storing out-of-band data access information on UNIX-type operating systems.

More generally, the invention provides an improved digital data processing apparatus of the type having (i) a memory element that stores data for access by one or more processes, and (ii) a secondary storage element, e.g., a disk drive, for non-volatile data storage. A paging mechanism, e.g., the operating system, selectively transfers sets of data between the memory and associated data file on the disk.

In one aspect, the improvement is characterized by a directory that stores "atomic" signals, or bits. Each such bit reflects an attribute, or state, of one or more data in the set. By way of example, these signals can reflect an access state of the associated data.

The paging mechanism includes a page-out element that stores data from a subset of the set to the associated data file. During paging, that element responds to data in the subset which are associated with the atomic state—as reflected by the atomic bit—for storing to an associated status file, on the disk, signals representing the attributes of the paged data. Those signals can be, for example, the atomic bits themselves.

According to another aspect of the invention, the page-out element stores attribute-representative signals to the status file during paging, regardless of whether any data in the subset being paged is in the atomic state. This occurs, for example, where a status file associated with the data file has already been created and stores attribute-representative signals for other data in the set.

In still another aspect of the invention, the page-out element tracks a range, or window, of the addresses of data in the set for which the attribute, e.g., the access restrictions, have been changed by a process. When paging a data subset falling outside the window, the page-out element does not determine whether any data in that subset is associated with the attribute, e.g., the atomic state.

According to this aspect, a process executing on the digital data processor can request allocation of a new datum within the set. A memory manager responds to that request by allocating the requested datum. Where the address of that datum falls outside the window, the manager disables a process from associating that datum with the attribute—that is, for example, preventing the process from claiming exclusive access to the datum.

When a process attempts to make the datum atomic, the manager generates a trap, while at the same time enabling atomic association and setting the atomic bit for that datum. The page-out element responds to the trap for expanding the window to include the address of that datum.

In a related aspect of the invention, the paging mechanism immediately enables atomic state association for data whose addresses lie within the window.

In still another aspect, the paging mechanism includes a page-in element for restoring data to the set from the associated data file. The page-in elements responds to data in the data file which is associated with the attribute-representative signal for placing that data, upon being restored in the set, in the atomic state.

Particularly, upon restoring from the disk a datum associated with the attribute-representative signal, the page-in element generates a GET signal, to which the memory manager responds for placing that datum in atomic state. This is the same signalling mechanism utilized by processes for setting the atomic bit.

These and other aspects of the invention are evident in the attached drawings and in the description which follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
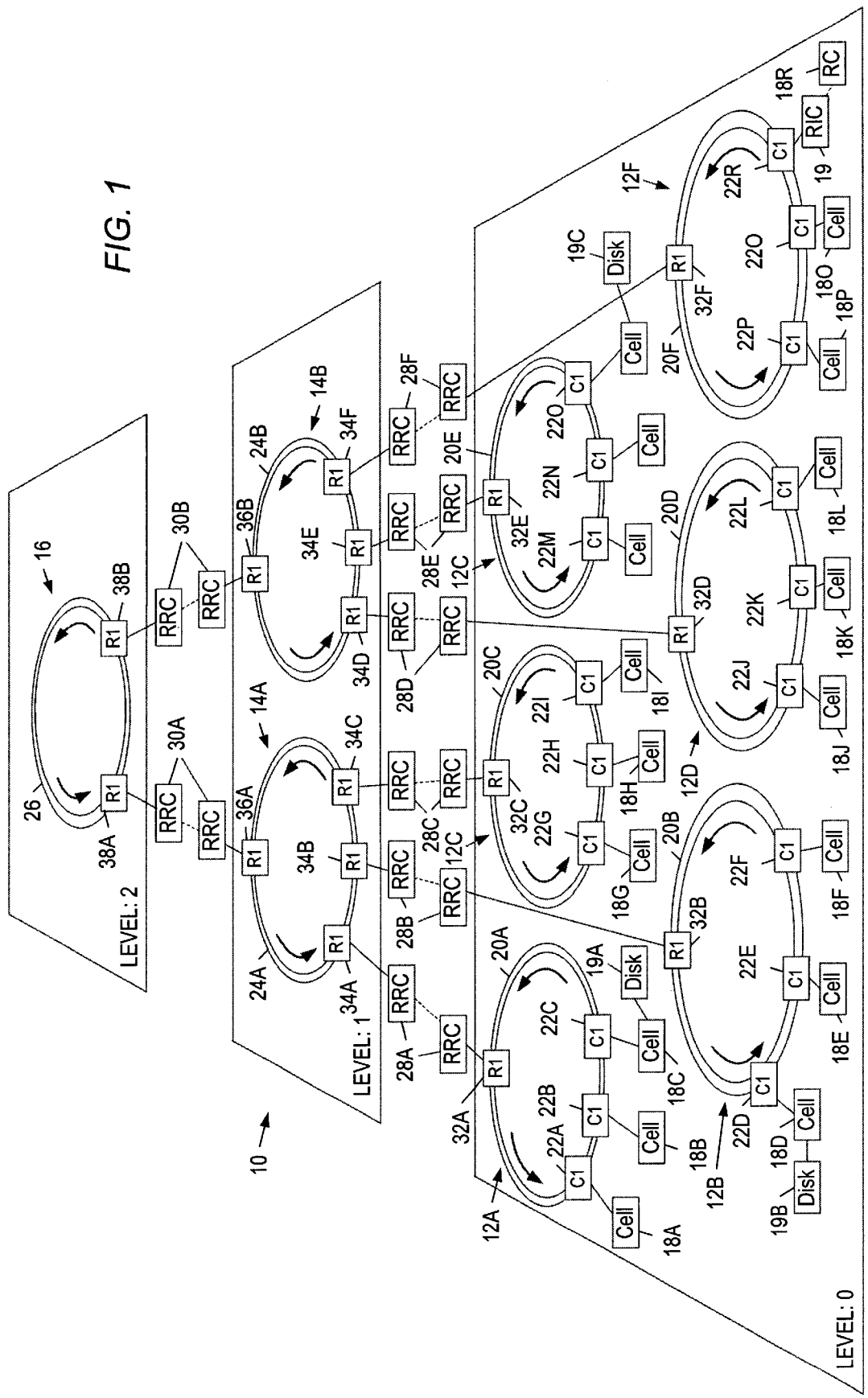
FIG. 1 depicts the structure of a multiprocessing system for use in a preferred practice of the invention.

FIG. 1 depicts a preferred multiprocessing system used to practice the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B, . . . 12F, comprise a plurality of processing cells. For example, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

Certain cells of the processing system 10 are connected to secondary storage devices. In the illustrated system, for example, cell 18C is coupled with disk drive 19A, cell 18D is coupled with disk drive 19B, and cell 18O is coupled with disk drive 19C. The disk drives 19A–19C are of conventional design and can be selected from any of several commercially available devices. It will be appreciated that secondary storage devices other than disk drives, e.g., tape drives, can also be used to store information.

As further illustrated, each level:0 segment may be characterized as having a bus element providing a communication pathway for transferring information packets between the cells of the segment. Thus, illustrated segment 12A is characterized by bus 20A, segment 12B by 20B, segment 12C by 20C, et cetera. As described in greater detail below, digital information packets are passed between the cells 18A, 18B and 18C of exemplary segment 12A by way of the memory elements associated with each of those cells. Specific interfaces between those memory elements and the bus 20A are provided by cell interface units 22A, 22B and 22C, as shown. Similar direct communication pathways are established in segments 12B, 12C and 12D between their respective cells 18D, 18E . . . 18R by cell interface units 22D, 22E, . . . 22R, as illustrated.

As shown in the illustration and noted above, the remaining information transfer levels, i.e., level:1 and level:2, each include one or more corresponding level segments. The number of segments in each successive segment being less than the number of segments in the prior one. Thus, level:1's two segments 14A and 14B number fewer than level:0's six 12A, 12B . . . 12F, while level:2, having only segment 16, includes the fewest of all. Each of the segments in level:1 and level:2, the "higher" levels, include a bus element for transferring packets within the respective segments. In the illustration, level:1 segments 14A and 14B include bus elements 24A and 24B, respectively, while level:2 segment 16 includes bus element 26.

Routing cells themselves provide a mechanism for transferring information between associated segments of successive levels. Routing cells 28A, 28B and 28C, for example, provide a means for transferring information to and from level:1 segment 14A and each of level:0 segments 12A, 12B and 12C, respectively. Similarly, routing cells 28D, 28E and 28F provide a means for transferring information to and from level:1 segment 14B and each of level:0 segments 12D, 12E and 12F, respectively. Further, routing cells 30A and 30B provide an information transfer pathway between level:2 segment 16 and level 1 segments 14A and 14B, as shown.

The routing cells interface their respective segments via interconnections at the bus elements. Thus, routing cell 28A interfaces bus elements 20A and 24A at ring interconnects 32A and 34A, respectively, while element 28B interfaces bus elements 20B and 24B at ring interconnects 32B and 34B, respectively, and so forth. Similarly, routing cells 30A and 30B interface their respective buses, i.e., 24A, 24B and 26, at ring interconnects 36A, 36B, 38A and 38B, as shown.

Data Movement & Coherency

Figure 2A:
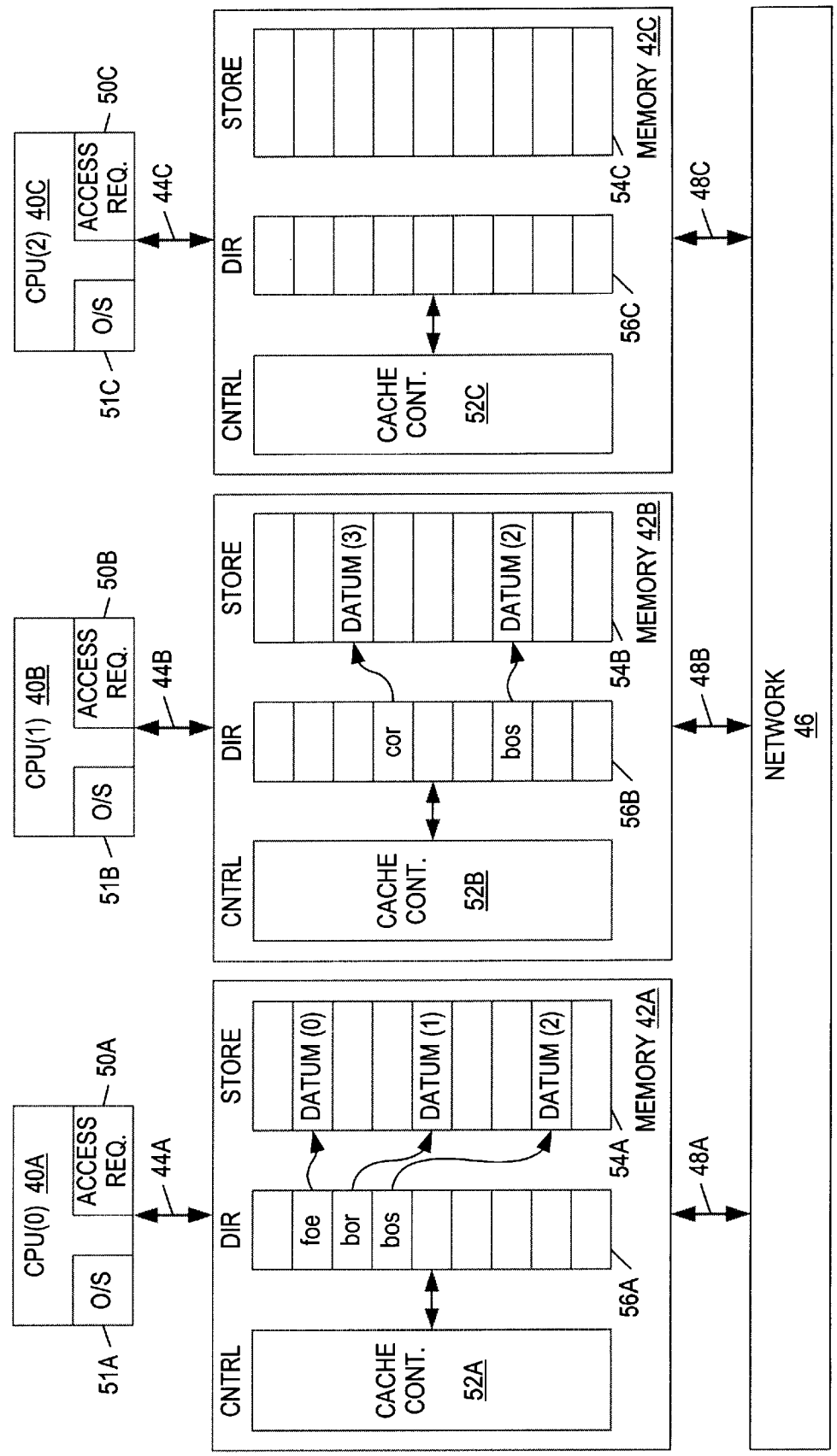
FIGS. 2A–2B depict a preferred memory configuration and data management function for the multiprocessor of FIG. 1.

FIG. 2A illustrates a mechanism for data movement within the processing system of FIG. 1 for insuring data coherence. In the drawing, plural central processing units 40(A), 40(B) and 40(C) are coupled, respectively, to associated memory elements 42(A), 42(B) and 42(C). Communications between the processing and memory units of each pair are carried along buses 44A, 44B and 44C, as shown. Network 46, representing the aforementioned level segments and routing cells, transfers information packets (passed to the network 46 over buses 48(A), 48(B) and 48(C) between the illustrated memory elements 42A–42C.

In the illustrated embodiment, the central processing units 40A, 40B and 40C each include an access request element, labelled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The central processing units 40A, 40B, 40C operate under control of an operating system which includes operating system portions 51A, 51B and 51C which are resident on respective ones of the central processing units. The operating system provides an interface between applications programs executing on the central processing units and the system 10 facilities, and includes a virtual memory management system for managing data accesses and allocations.

A preferred operating system for controlling central processing units 40A, 40B and 40C is a UNIX-like operating system (i.e., a UNIX™ operating system or an an operating system based on, or construted and operating similarly to the UNIX™ operating system) and, more preferably, the OSF/1 operating system available from Open Software Foundation, modified in accord with the teachings herein.

The memory elements 40A, 40B and 40C include cache control units 52A, 52B and 52C, respectively. Each of these cache control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units. Thus, store 54A maintains data and control information used by CPU 40A, while stores 54B and 54C maintain information used by central processing units 40B and 40C, respectively. The data maintained in each of the stores are identified by unique descriptors corresponding to system addresses. Those descriptors are stored in address storage locations of the corresponding directory. While the descriptors are considered unique, multiple copies of some descriptors may exist among the memory elements 42A, 42B and 42C where those copies themselves identify copies of the same data element.

Access requests generated by the central processing units 40A, 40B and 40C include, along with other control information, a descriptor or SVA ("system virtual address") request portion matching that of the requested datum. Each cache control unit 52A, 52B or 52C responds to access requests generated by its respective central processing units 40A, 40B or 40C by determining whether the requested datum is stored in the associated storage element 54A, 54B or 54C. If so, that item of information is transferred for use by the requesting central processor unit. If not, the cache control unit 52A, 52B, or 52C transmits a packet including the request to the network 46 along respective lines 48A, 48B or 48C.

As that packet travels within the networks and, particulary, along the level:0 segments, cache control units within the processing cells check their own directories, passing the requested data, if found, in a response packet. Likewise the local routing cell checks its directory. If that a routing cell's directory shows that the requested data is present in local segment, or ring, in the proper access state, it (that is, the routing cell) permits the request packet to continue along the local ring bus. If not, the routing cell extracts the packet and routes it to the associated level:1 segment.

The unresolved request packet travels along the level:1 segment in a similar fashion, i.e., it is compared with the directories of the associated level:1 routing cells. If one of those directories lists the requested data in the proper access state in a descendant level:0 segment, the request is passed to that segment. Otherwise, the request packet may pass to a higher level, if any, in the hierarchy or be returned to the requester unresolved.

Packets containing requested data are routed back to requesting cells by differing mechanisms. A first mechanism relies on the address, or ID, of the requesting cell. Here, each requesting cell includes within its request packet an ID uniquely identifying that cell. Once that packet reaches the responding cell, that cell copies the requestor-ID, along with the datum and corresponding descriptor, into the response packet. As the response packet travels along the segment rings, the routing cells examine the requestor-ID to determine whether the requesting cell is in a descendant or parent segment and route the packet accordingly.

A second mechanism is used in conjunction with response packets that include data requested by processing cells but not specifically generated in response to those requests. By way of example, the mechanism applies in instances where two or more requesting cells generate requests for read-only copies to a specific datum held in a remote cell.

Presuming, in accord with one preferred practice of the invention, that the network prevents at least some, but not all, of those requests from reaching a processing cell having a copy of that datum, the responding cell generates response packets bearing only the requestor-ID of a request packet that reached it.

Data coherency is maintained by cooperative action of the processing cells in response to data requests and transfers. More particularly, concurrent with generation of an ownership-access request packet by a first processing cell, the associated memory allocates in its store physical space to hold the requested data. Likewise, concurrent with the transfer of a requested datum from the processing cell in which it was previously stored, the associated memory deallocates physical storage space which had been previously allocated for storage of the requested datum.

Figure 2B:
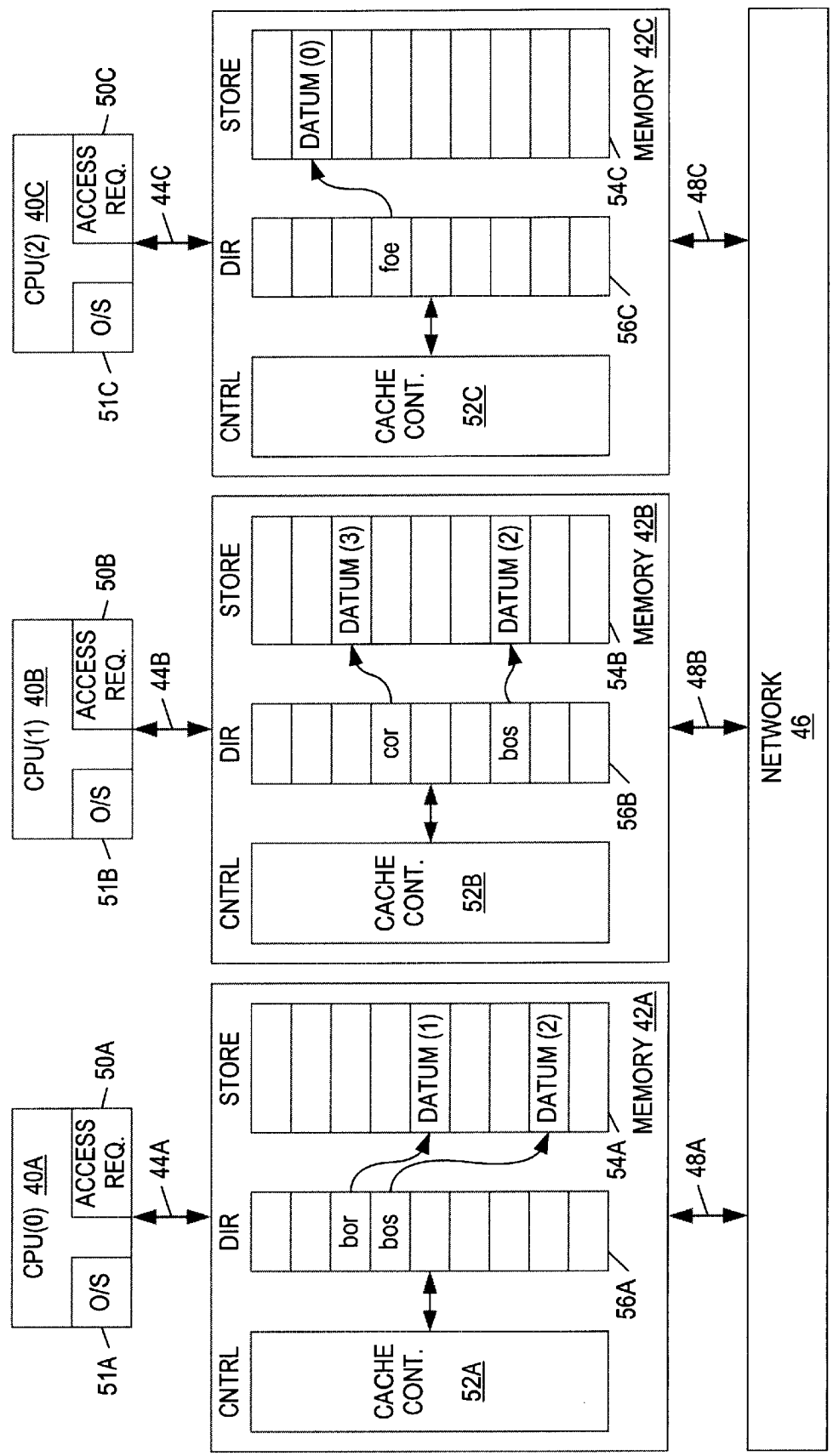

These cooperative actions are illustrated in FIGS. 2A and 2B. In the first of those drawings, DATUM(0), DATUM(1) and DATUM(2), representing data subpages, are retained in the store of the memory element 42A partnered with CPU 40A. Descriptors "foo," "bar" and "bas" which correspond, respectively, to those data, are stored in directory 56A. Each such descriptor includes a pointer indicating the location of its associated information signal in the store 54A.

The memory element 42B associated with CPU 40B stores DATUM(2) and DATUM(3), which also represent a data subpage., Corresponding to each of those data elements are descriptors "car" and "bas," retained in directory 56B. DATUM(2), and its descriptor "bas," are copied from store 54A and, therefore, retain the same labels.

The system illustrated in FIG. 2A does not store any data in the memory element 54C associated with CPU 40C.

FIG. 2B illustrates how a datum moves in conjunction with an ownership for it by processing cell which does not already have access to that datum. In particular, the illustration depicts the movement of DATUM(0) following issuance of an unresolved request for ownership for it by the processing cell made up of CPU 40C and memory 42C. At the outset, concurrent with the request, the cache control unit 52C allocates physical storage space in the store 54C of memory element 42C.

A response packet generated by memory 42A transfers the requested data, DATUM(0), from store 54A, where it had previously been stored, to the requestor's store 54C. Concurrently, the cache control unit 52A deallocates that space in store 54A which had previously held the requested datum. At the same time, the cache control unit 52A effects invalidation of the descriptor "foo" in directory 56A (where it had previously been used to identify DATUM(0) in store 54A), while cache control unit 52C establishes that same descriptor in directory 56C, where it will subsequently be used to identify the signal in store 54C.

In addition to descriptors, the memory elements 42A–42C assign access state information to the data and control signals in their respective stores. These access states, which include the invalid, read-only, ownership and atomic states, govern the manner in which data may be accessed by specific processors. A datum which is stored in a memory element whose associated central processing unit (CPU) maintains modification access over that datum is assigned an ownership state, while a datum which is stored in a memory element whose associated central processor unit (CPU) does not maintain priority access over that datum is assigned a read-only state. Further, a datum which has "bad" data is assigned the invalid state.

A further appreciation of preferred structures (e.g., cache control units) for data movement and memory coherence in a digital data processing system constructed in accordance with the invention may be had by reference to the above-cited related applications, e.g., U.S. patent application Ser. No. 136,930, filed Dec. 22, 1987, now U.S. Pat. No. 5,055, 999, U.S. patent application Ser. No. 370,287, filed Jun. 22, 1989, now U.S. Pat. No. 5,251,308, U.S. patent application Ser. No. 521,798, filed May 10, 1990, now U.S. Pat. No. 5,282,201, and U.S. patent application Ser. No. 531,506, filed May 31, 1990, now U.S. Pat. No. 5,341,483.

Segment Bus

Figure 3:
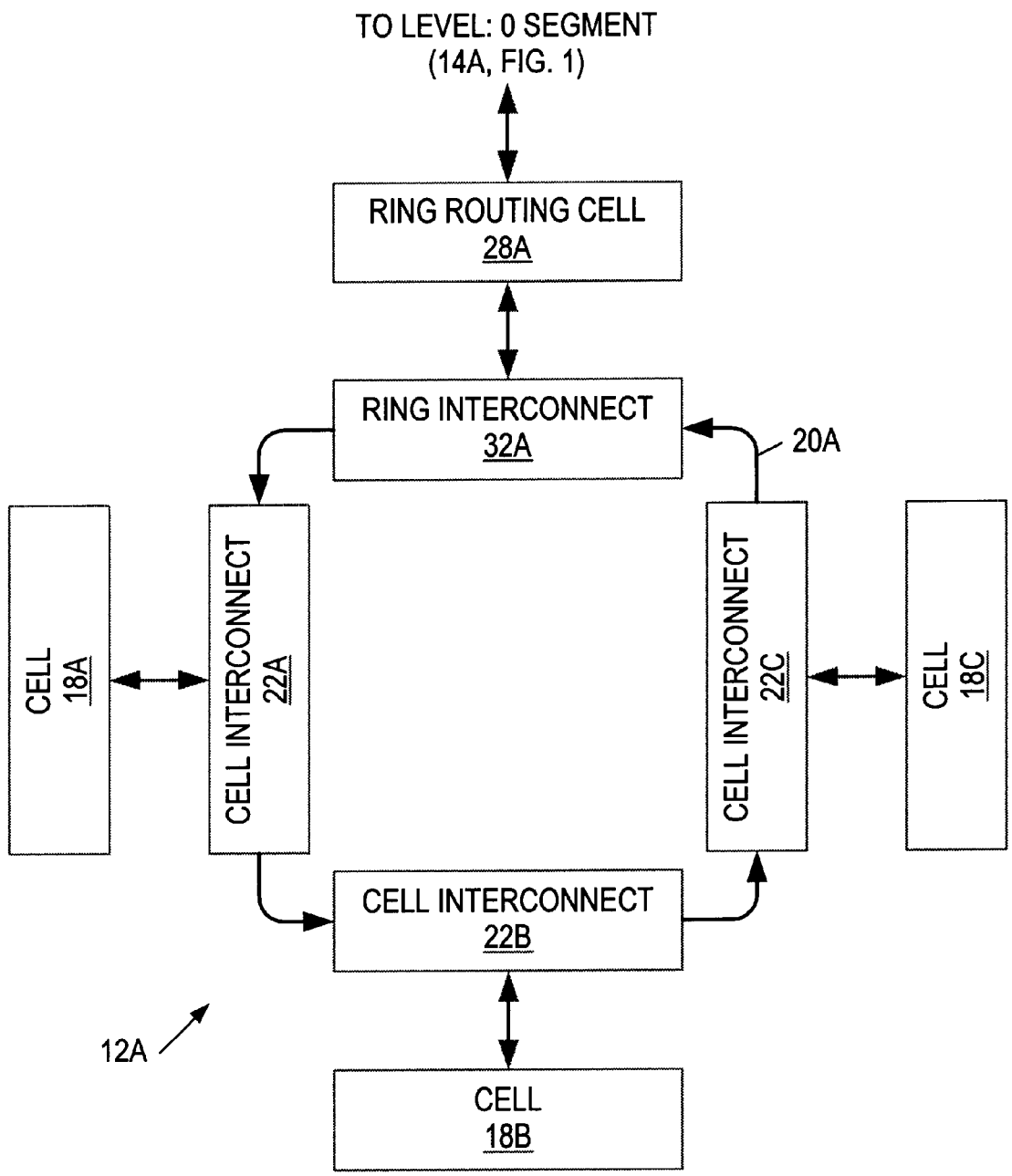
FIG. 3 depicts a preferred configuration for an exemplary level:0 segment of the multiprocessing system of FIG. 1.

FIG. 3 depicts a preferred configuration for exemplary level:0 segment 12A of FIG. 1. The segment 12A includes processing cells 18A, 18B and 18C interconnected by cell interconnects 22A, 22B and 22c along bus segment 20A. Routing unit 28A provides an interconnection between the level:0 segment 12A and if present, level:1 segment 14a of FIG. 1. This routing unit 28A is coupled along bus 20A by way of cell interconnect 32A, as shown. The structure of illustrated bus segment 20A, as well as its interrelationship with cell interconnects 22A, 22B, 22C and 32A, may be fully appreciated by reference to the above-cited related applications, e.g., U.S. patent application Ser. No. 696,291, now U.S. Pat. No. 5,119,481, issued Jun. 2, 1992.

Processing Cell

Figure 4:
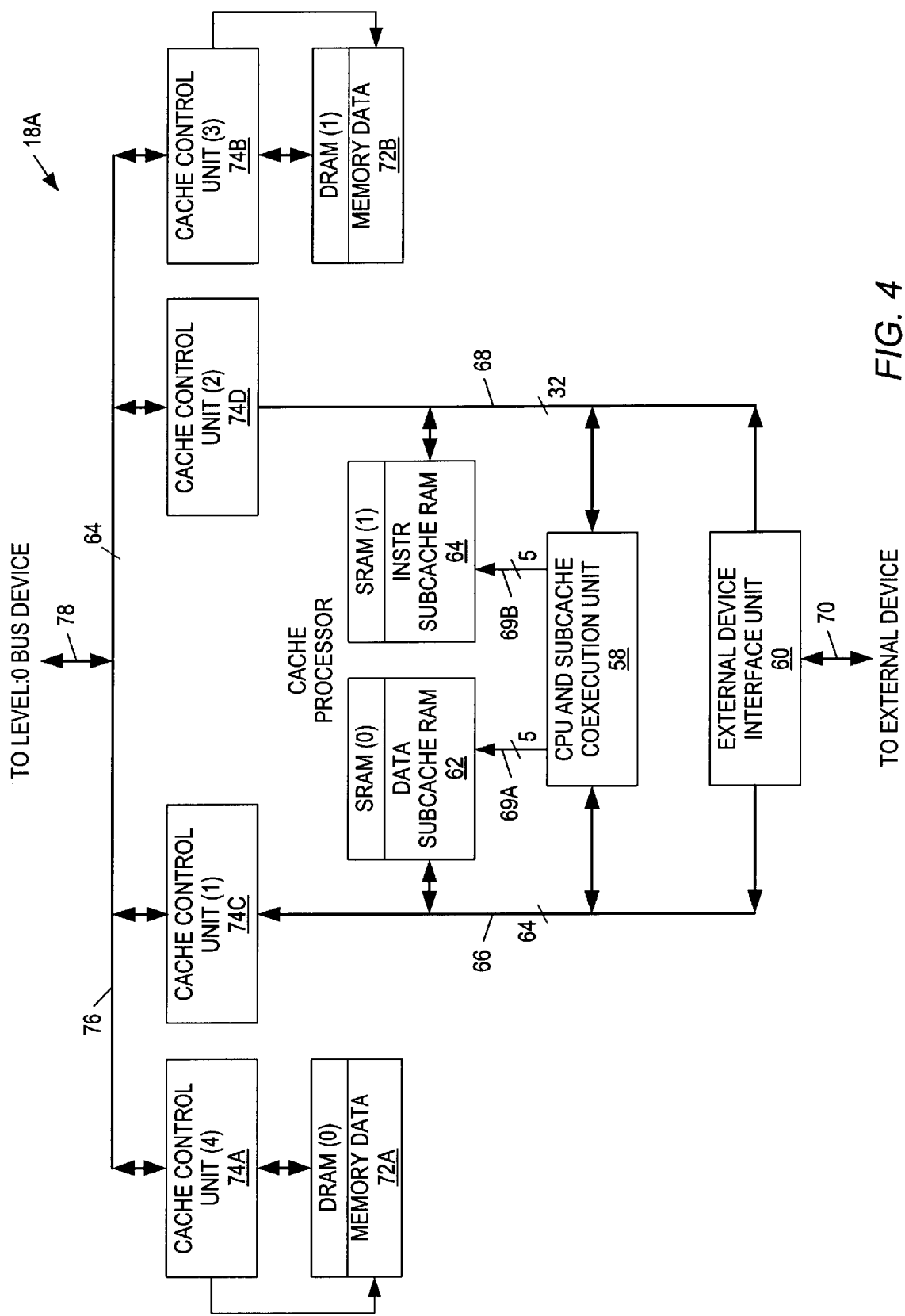
FIG. 4 depicts a preferred structure for processing cells of the multiprocessing system of FIG. 1.

FIG. 4 depicts a preferred structure for an exemplary processing cell 18A of the illustrated embodiment. The illustrated processing cell 18A includes a central processing unit 58 coupled with external device interface 60, data subcache 62 and instruction subcache 64 over processor bus 66 and instruction bus 68, respectively.

Interface 60 provides communications with an external device, e.g., disk drive 19A, over external device bus 70, in a manner conventional to the art.

A more complete understanding of the circuitry illustrated in this drawing may be attained by reference to the above-cited related patent applications, e.g., U.S. patent appn. Ser. Nos. 136,930, filed Dec. 22, 1987, now U.S. Pat. No. 5,055,999, issued Oct. 8, 1991, U.S. patent appn Ser No. 370,325, filed Jun. 22, 1989, now abandoned in favor of U.S. patent appn. Ser. No. 08/461,166, filed Jun. 5, 1995; and U.S. patent appn. Ser. No. 499,182, filed Mar. 26, 1990, now 5,335,325 issued Aug. 2, 1994.

The Memory System

As discussed above, a multiprocessing system 10 constructed in accordance with a preferred embodiment of the invention permits access to individual data elements allocated to processing cells 18A, 18B, . . . 18R by reference to a unique descriptor, based on a system virtual address (SVA), associated with each datum. In the illustrated system 10, implementation of this capability is provided by the combined actions of the processing cell memory units in connection with their transfer of request and response packets over the network 46. In the discussion which follows, this is collectively referred to as the "memory system."

The illustrated system's processors, e.g., processors 40A, 40B, 40C, communicate with the memory system via two primary logical interfaces. The first is the data access interface, which is implemented by the load and store instructions. In a data access mode, the processor presents the memory system with an SVA and access mode information, and the memory system attempts to satisfy that access by finding the subpage containing the data and returning it.

The second logical interface mode is control access, which is implemented by memory system control instructions. In control access, the processor instructs the memory system to perform some side effect or return some information other than the actual data from a page. In addition to the primary interfaces, the operating system uses control locations in SVA space for configuration, maintenance, fault recovery, and diagnosis.

The memory system implements a hierarchy of storage. In the illustrated, preferred embodiment, each processing cell contains a central processing unit (CPU or CEU) which has a subcache that stores 0.5 MBytes of data. Those processing cells also include caches, which store 32 MBytes of data. Moreover, a preferred level:0 having, for example, 15 processing cells stores a total of 480 MBytes. While, a preferred level:1 having, for example, 32 level:0's has a total of 15360 MBytes.

The memory system stores data in units of pages and subpages. For example, in the illustrated embodiment, each individual cache describes 32 Mbytes of SVA space, subdivided into 2048 pages. Pages contain $2^{14}$ (16384) bytes, divided into 128 subpages of $2^7$ (128) bytes. The memory system allocates storage in the caches on a page basis, and each page of SVA space is either entirely represented in the system or not represented at all. The memory system shares data between caches in units of subpages.

When a page of SVA space is resident in the system, the following are true:

(1) One or more caches allocates a page of storage to the page, each subpage of the page is stored in one or more of the caches with space allocated, but (2) Each cache with space allocated for a page may or may not contain a copy of all (or any) of the page's subpages.

A further appreciation of a preferred memory system for use in a digital data processing system constructed in accordance with the invention may be had by reference to the above-cited related applications, e.g., U.S. patent application Ser. No. 136,930, filed Dec. 22, 1987, and U.S. patent application Ser. No. 370,287, filed Jun. 22, 1989, U.S. patent application Ser. No. 521,798, filed May 10, 1990, and U.S. patent application Ser. No. 531,506, filed May 31, 1990.

Subpage States

The subpage states are defined in terms of three classes of subpage states: invalid, read-only, and owner. These three classes are ordered in strength according to the access that they permit. Invalid states permit no access. A read-only state permits load and instruction-fetch access. There are several owner states: all permit load access and permit the cache to respond to a data request from the network 46; some permit store access. Only one cache may hold a particular subpage in an owner state at any given time. The cache that holds a subpage in an owner state is called the owner of the subpage. Ownership of each subpage moves from cache to cache as processors request ownership via store instructions, special load instructions, and atomic state instructions (e.g., gsp or rsp) that request ownership.

Invalid States

When a subpage is not present in a cache, it is said to be in an invalid state with respect to that cache. If a processor requests a load or store to a subpage which is in an invalid state in its local cache, then that cache must request a copy of the subpage in some other cache in order to satisfy the data access. There are two invalid states: invalid-descriptor and invalid.

When a particular cache has no descriptor for a particular page, then all of the subpages of that page are said to be in an invalid-descriptor state in that cache. Thus, subpages in an invalid-descriptor state are not explicitly represented in the cache.

When the CEU references a subpage in invalid-descriptor state, the local cache must allocate one of the descriptors (in the correct set) to the SVA. After the descriptor allocation is complete, all subpages in the page have invalid state.

When the local cache has a descriptor for a particular page, but a particular subpage is not present in that cache, then that subpage is in invalid state. The local cache will attempt to obtain the subpage data by communicating with other caches.

Read-Only State

There is only one read-only state: read-only. Any number of caches may hold a particular subpage in the read-only state, provided that the owner of the subpage holds the subpage in a non-exclusive state. If the owner of the subpage has the subpage in any other state (i.e. an exclusive-ownership state, one of: exclusive, atomic, or transient-atomic), then no read-only copies can exist in any cell. The CEU cannot modify a subpage which is in the read-only state.

Owner States

There are two basic owner state types: non-exclusive and exclusive-ownership. When a particular cache holds a particular subpage in non-exclusive state, then some other caches may be holding that subpage in the read-only state. Programmatically, the non-exclusive state is the same as the read-only state. The CEU cannot modify a subpage which is in the non-exclusive state. The non-exclusive state is basically a book-keeping state used by the memory system; it defines the ownership of the subpage.

The exclusive-ownership states are exclusive, atomic, and transient-atomic. When a particular cache holds a particular subpage in the exclusive-ownership state, then no other cache may hold a read-only or non-exclusive copy of the subpage. If the local cache has a subpage in the exclusive-ownership state, the CEU can modify subpage data provided that the storage translation table (or "STT") grants write access to the segment and the descriptor no_write flag is clear.

Atomic State

Atomic state is a stronger form of ownership than exclusive state. Subpages only enter and leave atomic state as a result of explicit requests by programs.

Fundamentally, atomic state can be used to coordinate and limit access to any subpage in SVA space. When a processor executes a gsp.nwt (get-subpage, no-wait) instruction to request that a subpage enter atomic state, the instruction will only complete normally if the subpage is not in atomic state already. Thus, atomic state on a subpage can be used as a simple lock. The lock is locked when the gsp.nwt instruction completes normally by first obtaining the subpage in exclusive state and then changing state from exclusive to atomic. The lock is unlocked by executing the rsp (release-subpage) instruction. The rsp instruction requires that the subpage exist in some cache with atomic or transient-atomic state. The local cache obtains the subpage and then changes the subpage from atomic or transient-atomic state to exclusive state. (If the subpage has transient-atomic state, the operation is more complex, but the effect is programmatically the same.)

It is important to note that atomic state is associated only with a subpage; there is no association with a particular operating system process (typically a user program) or to a particular cell. It is possible for a process to execute a gsp instruction to get a subpage in atomic state and subsequently be switched by the operating system so that it continues execution on another cell. That process continues execution on the second cell and eventually executes an rsp instruction to release the subpage. Between those two instructions, there will only be a single copy of the subpage in the entire memory system, and it will be in atomic or transient-atomic state. As various processors execute instructions which reference the subpage, that single valid copy will move from cell to cell. It is also possible for a particular process to get atomic state, and another process to release atomic state.

Atomic state is simply an additional flag associated with a subpage; it is possible to implement protocols which use atomic state in addition to the data state of the subpage. Just as a protocol which is implemented using only data can have errors, it is possible for an atomic-state protocol to be defective. The hardware does not impose any checking on the use of atomic state beyond access control imposed by the STT and descriptor noatomic.

Transient-Atomic State

The gsp.nwt instruction is always completed within its defined execution time, but it can succeed or fail (depending upon the current state of the subpage in the memory system). A second form of the instruction is gsp.wt (get-subpage, wait), which will not be completed until the subpage is obtained in exclusive state and changed to atomic state. The gsp.wt instruction relieves the programmer of the burden of determining whether or not the gsp instruction was successful. If the subpage is already in atomic or transient-atomic state when a processor executes gsp.wt, the processor will stall until the subpage is released, obtained by the local cache, and changed back from exclusive state to atomic or transient-atomic state. Use of the gsp.wt instruction can reduce the number of messages sent between caches as a cell waits for the opportunity to "lock the lock."

Transient-atomic state is used automatically by the memory system to allow gsp.wt to function efficiently. Its use is entirely transparent to the programmer. If a subpage is in atomic state and another cache executes gsp.wt on that subpage, that subpage enters transient-atomic state in the holding cache. When the subpage is later released with an rsp instruction, the transient-atomic state forces the subpage to be expelled onto the network in a special release state. The releasing cache changes its own state for the subpage to invalid. Any cache which is executing a gsp will see the subpage and accept it. The accepting cache will then be able to complete its gsp instruction and the subpage will enter transient-atomic state in that cache. This operation will happen for each succeeding gsp and rsp until such time as an expelled subpage is not accepted by any other cache. At that time, the cache performing the release will change its subpage state back from invalid state (set when the subpage was released) back to exclusive state.

A further appreciation of preferred subpage states used in a digital data processing system constructed in accordance with the invention may be had by reference to the above-cited related applications, e.g., U.S. patent application Ser. No. 136,930, filed Dec. 22, 1987, U.S. patent application Ser. No. 370,287, filed Jun. 22, 1989, U.S. patent application Ser. No. 521,798, filed May 10, 1990, and U.S. patent application Ser. No. 531,506, filed May 31, 1990.

Cache Directories

The associations between cache pages and SVA pages are recorded by each cache in its cache directory. Each cache directory is made up of descriptors. There is one descriptor for each page of memory in a cache. At a particular time, each descriptor is said to be valid or invalid. If a descriptor is valid, then the corresponding cache memory page is associated with a page of SVA space, and the descriptor records the associated SVA page address and state information. If a descriptor is invalid, then the corresponding cache memory page is logically not in use. There is no explicit validity flag associated with a descriptor; a descriptor may be considered invalid if the anchor and held fields are both clear, and there are no valid subpages present for the SVA page.

Each cache directory acts as a content-addressable memory. This permits a cache to locate a descriptor for a particular page of SVA space without an iterative search through all of its descriptors. Each cache directory is implemented as a 16-way set-associative memory with 128 sets. All of the pages of SVA space are divided into 128 equivalence classes, each associated with a cache directory set. A descriptor for a page can only be stored in the set of a cache directory that corresponds to the page's equivalence class. The equivalence class is selected by SVA[20:14]. At any given time, a cache can describe no more than 16 pages with the same value for SVA[20:14], since there are 16 elements in each set.

Figure 5:
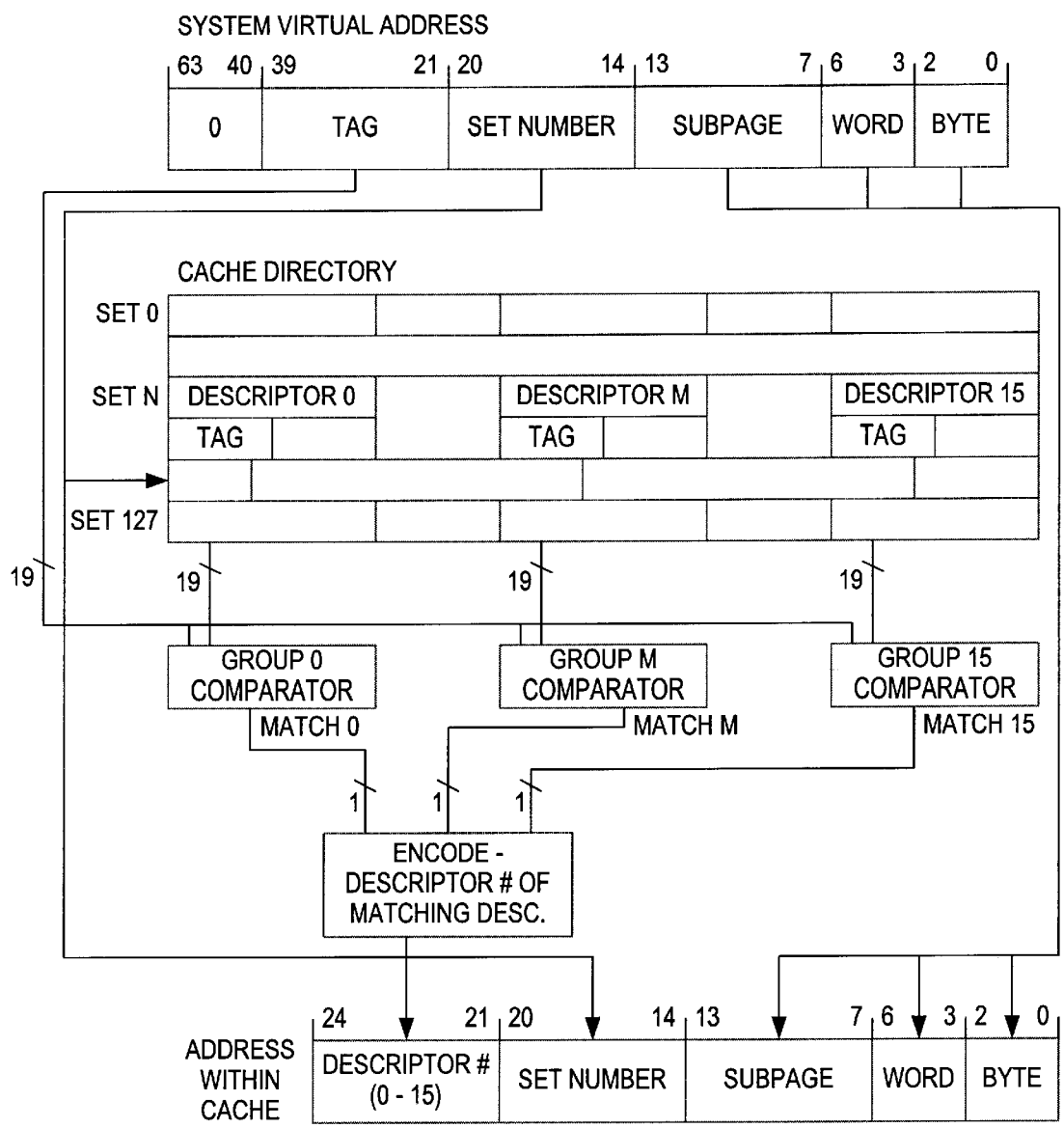
FIG. 5 depicts a preferred structure of a cache directory of the multiprocessing system of FIG. 1.

A preferred organization of a cache directory is shown in FIG. 5. When a reference to an SVA is made, the cache must determine whether or not it has the required information. This is accomplished by selecting a set within the cache, and then examining all the descriptors of that set. SVA[20:14] selects a set. In the general architecture, each of the descriptors in the selected set is simultaneously compared against SVA[63:21]. In a preferred embodiment having a 240 Mbyte SVA space, this implies a comparison with SVA[39:21]. If one of the elements of the set is a descriptor for the desired page, the corresponding comparator will indicate a match. The index in the set of the matching descriptor, concatenated with the set number, identifies a page in the cache.

If more than one descriptor matches, the cache signals a multiple descriptor_match exception. If no descriptor matches, the cache allocates a descriptor and requests data from the network. It is possible that either the allocation or data request will fail, and the cache will indicate an error to the CEU.

The use of SVA[20:14] to select a set is effectively a hash function over SVA addresses. The operating system must assign SVA addresses so that this hash function gives good performance in common cases. There are two important distribution cases: referencing many pages of a single segment and referencing the first page of many segments. This set selector produces good cache behavior for contiguous groups of pages, since 128 contiguous pages will reside in 128 distinct sets. However, this selector will produce poor hashing behavior for many pages with the same value in SVA[20:14]. The operating system can avoid the latter situation by varying the logical origin of data within segments. For example, each per-process user stack can be started at a different segment offset.

Contents of a Descriptor

When a cell responds to a request for a subpage, it supplies the subpage data and the values of certain descriptor fields in the local cache. When the response returns to the requester it either copies those fields to descriptor fields (if it has no other valid subpages) or logically OR's those fields into descriptor fields. Some descriptor fields are never supplied by the responder nor updated by the requester.

In a preferred embodiment, the descriptor fields are defined as follows:

descriptor.tag (19 bits) Bits [39:21] of an SVA. This field identifies the particular page of SVA space specified by the corresponding descriptor. For a given set in a given cell, this field must be unique among all 16 descriptors. The operating system 'sets' this field when it creates an SVA page. (It is also set by the operating system during cache initialization.)

descriptor.atomic_modified (1 bit) A cache sets this bit flag to one when any subpage of this page undergoes a transition into or out of atomic state because a gsp or rsp instruction was successfully executed. It is also set when a subpage changes from atomic state to transient-atomic state. This flag is not set if a gsp fails because the subpage is already in atomic state or if a rsp fails because the subpage was not in atomic state. This flag is not set if the gsp or rsp fails because descriptor.noatomic is set. The operating system sets this flag to zero to indicate that it has noted the atomic state changes. This field is propagated from cache to cache.

descriptor.modified (1 bit) A cache sets this bit flag to one when any data is modified in the page. The operating system sets descriptor.modified to zero to indicate that it has noted the modification of the page. This flag is not set if an attempt to modify data fails because descriptor.no_write is set. This field is propagated from cache to cache.

descriptor.referenced (1 bit) The cache sets this field on references to the page and clears the field periodically. This field is used to reflect that the page was recently referenced.

descriptor.anchor(1 bit) Software sets this field to indicate that data requests from other caches may not be honored nor may the descriptor be dropped. Any read or get request from another cache returns unresponded to the requester, and is treated as if the page were missing. This field is set by the operating system as part of creating or destroying an SVA page, and as part of modifying the page descriptor.

descriptor.held (1 bit) Software sets this field to indicate that the descriptor may not be dropped by the cache even if no subpages are present in the cache.

descriptor.no$_{13}$ atomic (1 bit) Software sets this field to prevent any cache from changing the atomic state of any subpage of this page. An attempt to execute a gsp or rsp fails, and is signalled back to the processor. The processor signals a page no-atomic exception. descriptor.no atomic can be altered even when some subpages have atomic state. This flag simply prevents attempt to change atomic state, in the same way that descriptor.no_write simply prevents attempts to change data state. This field is propagated from cache to cache.

descriptor.no_write (1 bit) Software sets this field to prevent modifications to the page by the local processor. An attempt to modify the page fails, and is signalled back to the processor. The processor signals a page_no write exception. This flag does not affect the ability of any cache to acquire the subpage in exclusive or atomic/transient-atomic state. This field is propagated from cache to cache.

descriptor.summary (3 bits) Summarizes subpage state field of a set of subpages. There is one three-bit summary field for each set of subpages. The summary sometimes overrides the contents of the individual subpage_state fields for the subpages within the summary set.

descriptor.subpage_state (4 bits) The four-bit subpage state field comprises defined by two fields, including a three-bit state field and a single bit subcached status field. The subpage state field is set by the cache to record the state of each subpage and to indicate whether or not any portion of the subpage is present in the CEU subcache.

A further appreciation of preferred structures for the cache directory and descriptors in a digital data processing system constructed in accordance with the invention may be had by reference to the above-cited related applications, e.g., U.S. patent application Ser. No. 136,930, filed Dec. 22, 1987, U.S. patent application Ser. No. 370,287, filed Jun. 22, 1989, U.S. patent application Ser. No. 521,798, filed May 10, 1990, and U.S. patent application Ser. No. 531,506, filed May 31, 1990.

Subpage Atomic State Instructions

The subpage atomic instructions are the program interface to the get and release operations described above. These instructions exist in several forms to permit precise tuning of parallel programs.

get subpage [gsp.nwt] get subpage & wait [gsp.wt] Get subpage requests that a subpage be set into atomic state. For both forms of the get subpage instruction, if the subpage is not in atomic state in any cache, then the local cache acquires it in atomic state.

For gsp.nwt, a condition code "@MEM" indicates the success or failure of the attempt; the instruction will trap (that is, the processor processing the gsp.nwt will sequence to a trap routine) instead of changing @MEM if the trap option is present in the instruction and the subpage is already atomic.

The gsp.wt instruction form causes the cache to stall the CEU until the subpage can be obtained in atomic state. This reduces the amount of interconnect traffic if the program must obtain atomic state before it can proceed. If the subpage is already atomic in any cache (including the local cache), the instruction waits until the subpage is-released. The local cache then acquires the subpage in atomic state. The @MEM condition is always changed to indicate success.

release subpage [rsp] Release subpage is used to remove a subpage from atomic state. If the subpage is not present in the local cache, it is first requested in via the interconnect. Once the local cache has exclusive ownership, rsp proceeds. If the subpage is not in atomic state then release subpage does not change the subpage state. In this situation, the CEU will trap if a trap modifier is present for the instruction. If the subpage is in atomic state, it is changed to exclusive state. If the subpage is in transient-atomic state, it is changed to exclusive state and expelled onto the interconnect so that any waiting cell may acquire atomic state.

Page Manipulation

The system 10 operates in the manner described below to create and destroy pages and change descriptor fields. This discussion assumes that an anchored descriptor exists on the local cache.

Creating an SVA page

Following execution of an mpsa instruction (which, as described below, provides an anchored descriptor for an SVA page in the local cache of the processor executing the instruction), the descriptor exists, but all subpages are in invalid state. The operating system executes an mpdw instruction specifying that all subpage states should be set to exclusive. This causes a message to be sent on the network 46 so that any interested ring members may note the creation of the page. The SVA page now exists, although its data values are undefined. Software must initialize the page using store instructions or 1/0 before allowing the user to reference the page. For this reason, the operating system will typically create a page at an SVA location inaccessible to user programs, initialize the page data, and then change the address of the SVA page as described below. The page is released for general use by executing an mpdw instruction which clears the anchor.

Destroying an SVA page

After the mpsa instruction, the operating system must obtain all subpages in exclusive state. This is done using mfsva instructions. The operating system then executes an mpdw instruction specifying that all subpages should be changed to invalid state. This instruction causes a message to be sent on the network 46 so that any interested ring members may note the destruction of the page. The SVA page is destroyed by this operation. Software releases the descriptor for reuse by executing a second mpdw instruction which clears the anchor.

Change Descriptor Fields

The mpdw instruction is used to change various fields in a local descriptor. It can set or clear the modified, atomic_modified, no_write, noatomic, and held fields and can clear the anchor field. mpdw can also change the tag, and thus the SVA space address associated with the descriptor. (Since the index of the descriptor forms part of the SVA, the new tag is in the same cache set, by definition.)

To ensure memory system consistency, the operating system must obey certain rules when altering the fields or tag of a descriptor. mpdw requires that descriptor.anchor be set (although the instruction itself may result in clearing descriptor.anchor). Various sequences require that all subpages be present in the local cache with an exclusive-ownership state. This is accomplished by setting descriptor.anchor and executing mfsva.ex for each subpage. Various sequences require that all subpages be cached in the local cache. This is accomplished by executing mflsp for each subpage which might be cached in the local CEU. (Executing an mfsva.ex instruction ensures that a subpage is not cached in by the CEU of any other cell.)

Memory System Control Instructions

Memory system control instructions permit the processor to directly manipulate the memory system. There are two classes of control instructions: data movement and page state control. The data movement control instructions move pages and subpages of data from cache to cache in the hierarchy. The page state control instructions manipulate page descriptors.

These CEU instructions result in cache commands which execute synchronously or asynchronously, depending upon the command. A CEU cache instruction may occupy an entry in a hardware table for the cache (identified herein as the "PRT") while it is in progress. The PRT has four entries, so a maximum of four cache instructions may execute in parallel. Most of these CEU instructions result in assignment of a PRT entry which remains in use until the request is satisfied, providing synchronous behavior. For example, load/store instructions execute synchronously, so that certain software-controlled exceptions (such as missing page or unwritable page) can be predictably resolved. The pcsp (prefetch-cache-subpage) and pstsp (post-store-subpage) instructions operate asynchronously, as described in following subsections.

Synchronous errors typically result in the CEU executing the trap sequence.

Asynchronous errors result from actual hardware errors or are provoked by a request from some other cache. Such errors are reported by memory-system interrupts.

Fetch Subpage Instruction

The mfsva instruction permits the operating system to fetch a subpage in read-only or exclusive-ownership state, specifying the SVA location of the subpage. This saves the operating system the effort of establishing a DSTT translation, as is required by pcsp.

Flush Subcached Subpage Instruction

The mflsp instruction causes the cache to ensure that the specified subpage is not subcached in the local CEU. If the subpage is in invalid-descriptor state or invalid state, no descriptor is allocated and the subpage is not requested via the network 46.

Recombine Subpage Instruction

The mrcsp instruction allows the operating system to reduce the number of active descriptors for a page by causing ownership to migrate to another cache. Unlike the background recombine activity of the cache, this instruction is not controlled by cache configuration parameters.

The page state control instructions operate on individual pages of SVA space.

Anchor Descriptor Instruction

The mpsa instruction provides an anchored descriptor in the local cache for an SVA page. If the descriptor already existed prior to the mpsa, its anchor flag is set. Otherwise, the cache allocates a descriptor and then sets the anchor flag. Page state control operations require that an anchored descriptor for the SVA page be present on the local cache.

Write Descriptor Instruction

The mpdw instruction is used to create and destroy SVA pages, and to change descriptor flags of existing SVA pages. mpdw requires that the operating system first obtain an anchored descriptor for the page, using the mpsa instruction.

A further appreciation of memory system control instructions in a digital data processing system constructed in accordance with the invention maybe had by reference to the above-cited related applications, e.g., U.S. patent application Ser. No. 136,930, filed Dec. 22, 1987, U.S. patent application Ser. No. 370,287, filed Jun. 22, 1989, U.S. patent application Ser. No. 521,798, filed May 10, 1990, and U.S. patent application Ser. No. 531,506, filed May 31, 1990.

Virtual Memory System

As noted above, the operating system includes a mechanism for managing data accesses and allocations. That mechanism is referred to as the "virtual memory" or "VM" system. As part of the operating system, at least portions of the VM system are resident on every cell, for example, for operation in conjunction with central processing units 40A, 40B, 40C.

The VM system has three major responsibilities. First, it manages each process's context address (CA) space. This includes the mapping of CA space to a region of SVA space using the segment translation table entries (STTE's). This also includes process management. Aspects of these functions are discussed in further detail in copending, commonly assigned U.S. patent application Ser. No. 07/763,505, filed this day herewith, for DIGITAL DATA PROCESSOR WITH IMPROVED CHECKPOINTING & FORKING, now U.S. Pat. No. 5,313,647, issued May 17, 1994

Second, the VM system is responsible for resolving page faults and most of the trap conditions. Part of this task is reducing the frequency of the more severe types of faults, such as "line-fulls" and faults that result in paging to or from devices. This is handled by attempting to make the most efficient use of the physical memory available in the system. Aspects of this second function are discussed in further detail in copending, commonly assigned U.S. patent application Ser. No. 763,132, filed this day herewith, for "IMPROVED DIGITAL DATA PROCESSOR WITH DISTRIBUTED MEMORY SYSTEM", abandoned in favor of U.S. patent appn. Ser. No. 08/461,167, filed Jun. 5, 1995.

Third, it manages the SVA space. This includes mapping of objects (files, devices, etc.) to SVA regions and the maintenance of atomic state information for those regions. Aspects of this function are discussed below.

Paging Operations

Secondary storage devices, e.g., disk drives 19A–19C, are used to store at least those portions of the SVA space that are not resident in main memory. A page originally 'exists' only in secondary storage, and is cached in the memory system when it is referenced by a program.

The operating system maps all user files, and most system files, into the context address (CA) space of each process. A section of the file, known as the vm_window, is associated with a region of SVA and assigned a CA range within a process when the process maps in a portion of a file. Each section of the open file has at most one mapping to SVA, but may be mapped to different CA's in each process that is accessing it. While there may be multiple vm_windows on a file, they do not overlap and they are aligned on natural boundaries.

When a mapped file is first opened, the virtual memory system creates a corresponding entry in a table referred to as the vm_object table. Each "mapin" to a new region of the file causes a vm_window to be created, associating that region with a range of addresses in SVA. This association remains until the file system explicitly tells the VM system to release the object.

Each mapping of a file vm_window may range in size from $2^{22}$ bytes to a site-configurable maximum of $2^{32}$ bytes. If the map is extendable, its CA will be aligned on a multiple of the largest window size allowed. This allows the map to grow, without changing its CA address, which would invalidate pointers to areas within the map.

This same approach cannot be used with SVA, since the $2^{40}$ bytes available would soon run out. Vm_windows, therefore, are aligned on their natural boundaries. When a vm_window must be extended, its current SVA is deallocated, and a new, larger, chunk of SVA is associated with it. In order to extend a window, its base file offset must be on a natural boundary for the extended size.

Figure 6:
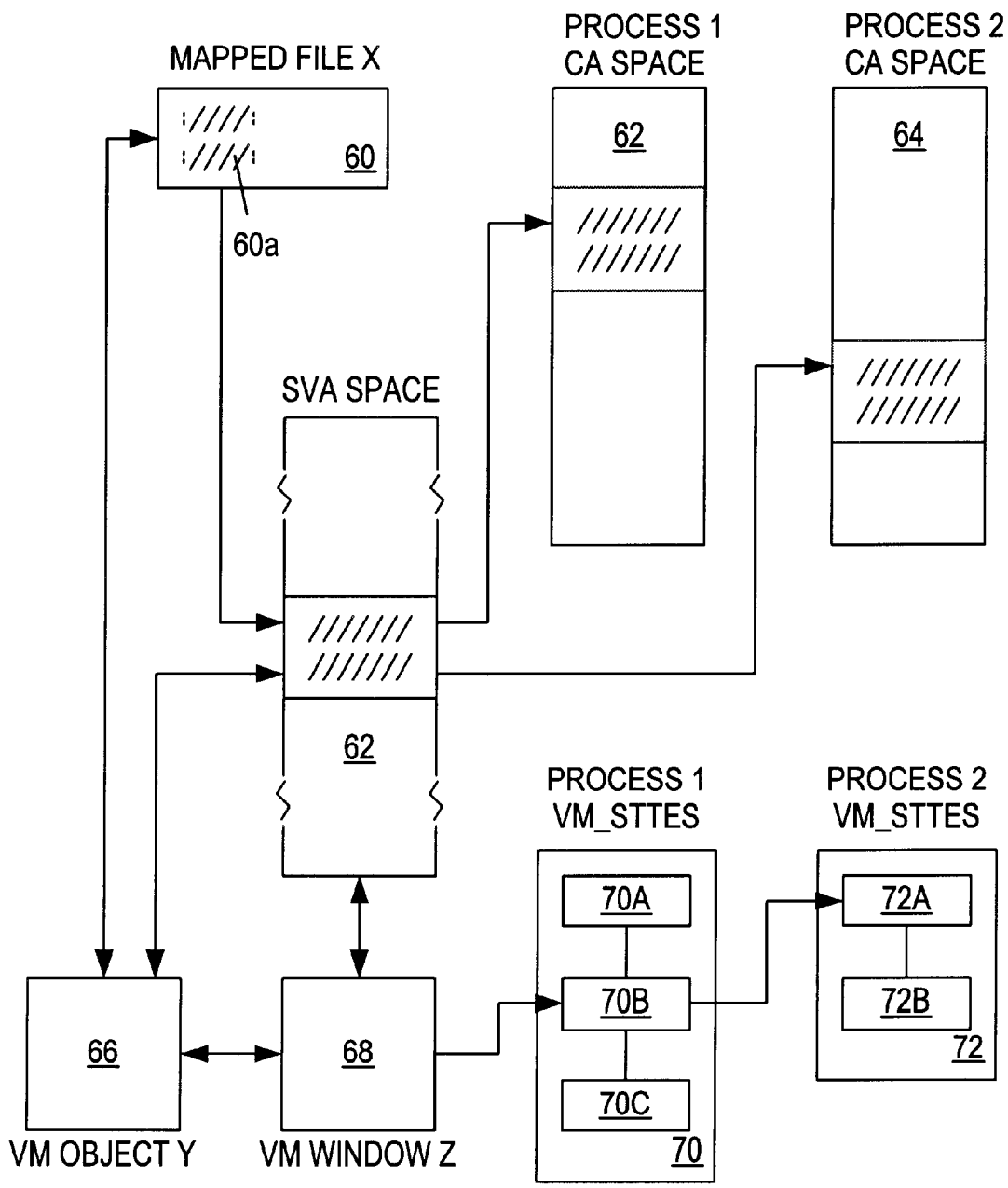
FIG. 6 illustrates the use of mapped files by the virtual memory (VM) system of a preferred digital data processor constructed in accord with the invention.

FIG. 6 illustrates data structures used in connection with the mapping of files by the VM system of a preferred digital data processor 10 constructed in accordance with the invention. It will be appreciated that SVA 62 represents information stored both in memory elements, e.g., 42A–42C, as well as on the secondary storage devices 19A–19C.

The VM system uses data structure 66, referred to as a vm_object, to store general mapping information about file 60. Information concerning specific mapped-in areas of the file, for example, shaded area 60A, are stored in data structure 68, referred to as a vm_window.

In the illustration, the mapped-in portion 60A of file 60 is associated with different context address spaces 62, 64 of two different processes. That association is reflected in storage translation tables, referred to as STT's, 70 and 72, respectively. Each table includes entries, referred to as STTE's, shown in FIG. 6 as STTE's 70A, 70B, 70C and 72A, 72B. The vm_sttes are linked in two directions: by process and by vm_window.

A preferred structure of vm_object 66, presented in the C programming language, is as follows:

```
typedef
enum vm_obj_type [          /* Specifies whether VM object holds text of data. */
VM_DATA_OBJECT,
VM_TEXT_OBJECT,
] vm_obj_type_t;
typedef
enum vm_obj_state [         /* Specifies the state of a VM object. *I
VM_OBJ_NOT_IN_USE,
VM_OBJ_CACHED,
VM_OBJ_ACTIVE,
VM_OBJ_DELETED,
] vm_obj_state_t;
```

-continued

```
typedef
struct vm_obj [
sem_t              lock;                /* Locks the object entry. */
struct vm_oij      *next_obj;           /* Next object in list. */
struct vm_obj      *prev_obj;           /* Previous object in list. */
vm_obj_p_off_t     low_addr_mapped;     /* Lowest page mapped. */
vm_obj_p_off_t     high_addr_mapped;    /* Highest page mapped. */
vm_obj_type_t      object_type;         /* Code or Text */
vm_obj_state_t     state;               /* Cached, active, deleted. */
time_t             cached_time;         /* Time on cached list (if any). */
u_int16            num_windows;         /* # of windows in the object. */
u_int32            offset_in_file;      /* File offset of base, if text. */
struct vnode       *mapped_file;        /* File mapped to this object. */
struct vnode       *atomic_state_file;  /* Object's atomic_state file. */
struct vm_obj      *overlay_object;     /* If not NULL, overlay object. */
u_int8             *overlay_count;      /* Number of objects using this as an
overlay object */
struct vm_window   *first_window;       /* First window in this object. */
struct vm_window   *last_window;        /* Last window in this object. */
] vm_obj_t;
typedef
struct vm_obj_list [
sem_t              lock;                /* Lock for object list. */
u_int32            num_objects;         /* # of objects in list. */
vm_obj_t           *first_object;       /* First object on list. */
vm_obj_t           *last object;        /* Last object on list. */
] vm_objJis_;
```

A preferred structure of vm-window 68 is as follows:

```
typedef
enum vm_window_state [
                              /* Specifies the state of a VM window. */
VM_WIN_NOT_IN_USE,
VM_WIN_CACHED,
VM_WIN_ACTIVE,
VM_WIN_PENDING_SWAPPED,
VM_WIN_SWAPPED,
] vm_window_state_t;
typedef
enum vm_win_acc [             /* Specifies the access pattern for a VM
VM_UNKNOWN,                   window. */
VM_RANDOM,
VM_SEQ_FORWARD,
VM_SEQ_BACKWARD,
] vm_window_acc_t;
typedef
struct vm_window [
sem_t              lock;               /* Locks the window ently. */
vm_obj_t           *object;            /* This window object. */
caddr_t            base_sva;           /* SVA of base of window */
u_int32            window_ength;       /* Length of the window. */
vrn_window_state-t state;              /* Window state -active, cached,
pending_swapp ed, or swapped */
vm_window_acc_t    access_mode;        /* Expected access type (random,
sequential forward, etc.) */
bool_t             atomic_enabled;     /* If true, atomic ops are OK. */
u_int16            procs_waiting;      /* # of processes waiting on window.
*/
u_int16            referenc_count;     /* # of maps to this window. */
u_int16            sttes_invalid;      /* # of maps that are invalidated. */
u_int8             extension_count;    /* # of times window has been
extended. */
vm_obj_p_off_t     offset_in_file;     /* File offset (in pages) of base. */
struct vm_stte     *first_stte;        /* First referencing vm_stte. */
struct vm_stte     *last_stte;         /* Last referencing vm_stte. */
struct vm_window   *indirect;          /* If not NULL, indirect window. */
vm_obj_p_off_t     last_fault_addr;    /* Last page fault offset (to disk). */
u_int16            run_length;         /* # of faults for sequential addrs. */
struct vm_window   *next_obj_win;      /* Next window in object. */
struct vm_window   *prev_obj_win;      /* Previous window in object. */
struct vm_window   *next_window;       /* Next window in list. */
struct vm_window   *prev_window;       /* Previous window in list. */
```

```
vm_obj_p_off_t        low_addr_ref;        /* Lowest page referenced. */
vm_obj_p_off_t        high_addr_ref;       /* Highest page referenced. */
vm_obj_p_off_t        low_addr_mod;        /* Lowest page modified. */
vm_obj_p_off_t        high_addr_mod;       /* Highest page modified. */
vm_obj_p_off_t        low_addr_atomic;     /* Lowest page atomic. */
vm_obj_p_off_t        high_addr_atomic;    /* Highest page atomic. */
u_int8                num_pub;             /* # of page note blocks. */
struct_vm_pnb         *first_pnb;          /* Window's first page note block.
/*
struct_vm_pnb         *last_pnb;           /* Window's last page note block. */
] vm_window_t;
typedef
struct vm_win_list [
sem_t lock;                                /* Lock for window list. */
u_int16               num_windows;         /* # of windows in the list.
vm_window_t           *first_window;       /* First window in list. */
vm_window_t           *last_window;        /* last window in list. */
] vm_win_list_t;
```

A preferred structure of STT's 70 and 72 and, more particularly, of STTE's 70A–70C and 72A, 72B1, is presented below:

```
typedef
struct vm_stte [
stte_t hardware_stte;   /* Hardware portion of vin_stte. */
u_int8                  stte_loaded;       /* The STTE number in which this
vm_stte is loaded. */
vm_inherit_attr_t       inheritance;       /* Inheritance rules for STTE. */
bool_t                  extendable;        /* If true, map can be extended. */
vm_obj_p_off_t          object_offset;     /* Page offset at which map starts.
*/
u_int32                 length;            /* Length of the map. If zero, the
map is invalid. */
vin_window_t            *window;           /* Window to which this entry maps.
*/
vin_obj_t               *object;           /* Object to which this entry maps.
*/
struct vm_stte          *prev_proc_stte;   /* Previous vm_stte that maps
                                              to the same process. */
struct vm_stte          *next_proc_stte;   /* Next vm_st te that maps to the sarne
process. */
struct vm_stte          *prev_win_stte;    /* Previous vm_stte that maps to the
same window. */
struct vm_stte          *next_win_stte;    /* Next vm_st te that maps to the same
window. */
] vm_stte_t;
typedef
struct vm_proc_stte_list [
u_int16                 num_sttes;         /* Number of text or data vm_sttes
*/
vm_stte_t               *first_stte;       /* First vm_s tte in list. */
vm_stte_t               *last_stte;        /* Last vm_st te in list. */
] vm_proc_stte_list_t;
```

Paging Atomic State Information

Because atomic state information is out-of-band, the virtual memory system must store that information when it pages-out a data structure to its associated file. Atomic state information takes up 128 bits for each nonresident page of a file that includes at least one atomic subpage. Consequently, a large mapped file may be associated with several megabytes of atomic information, which is too large to store in active memory, e.g., elements 54A–54C.

Accordingly, for each file for which atomic operations are enabled, the VM system maintains a parallel file of atomic-state information. These files are not themselves mapped. Rather, they are accessed directly, e.g., using calls to the file system of the UNIX-like operating system.

The atomic state files store one atomic state entry for each nonresident page in a mapped file for which at least one subpage is atomic. Each entry is a two-word field that is treated as an array of bits, each corresponding to one subpage in the page. One preferred structure, presented in the C programming language declaration, is as follows:

```
typedef
struct vm_atomic_state_t {
u_int64                 subpages[2];
}
```

The VM system sets a flag when a process executing on the system 10 maps in a window of a file for which atomic operations are possible. By relying on such a flag, the system eliminates the need for keeping an excess number atomic state files. This also facilitates paging, syncing and caching of non-atomic files, for which the system need not save or clear atomic state information.

The following sections, and accompanying FIGS. 7–10, set forth steps executed by the virtual memory system and, particularly, central processing units 40A, 40B and 40C in connection with the paging of files.

VM_ATOMIC_STATE_FILE_CREATE

The virtual memory system executes the steps of procedure VM_ATOMIC_STATE_FILE CREATE to create an atomic state file corresponding to an object, typically, a mapped file. This procedure is called prior to storing any atomic state information, either when the corresponding mapped file is opened or, preferably, just prior to reading or writing the first items of atomic information. A pool of atomic files can be maintained in order to enhance system performance.

Upon invoking VM_ATOMIC_STATE_FILE_CREATE, the VM system provides as input a pointer to the corresponding object, as well as the size of that object in pages. As a result of operation, the procedure provides as output a pointer to the atomic state file (preferably, UNIX file system vnode) and an indication of the status of the atomic state file creation operation.

Figure 7:
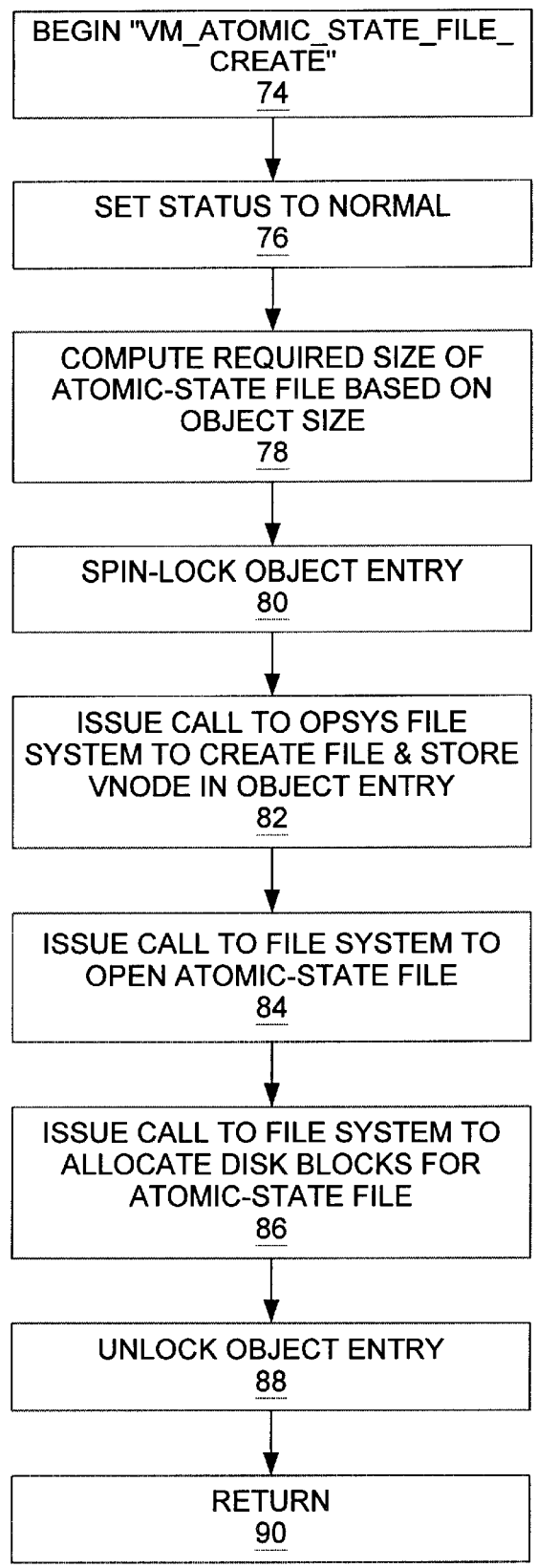
FIGS. 7–10 depict preferred steps executed by the multiprocessing system 10 to transfer atomic state information to and from a secondary storage device in connection with a paging operation.

A preferred sequence of steps for the procedure VM_ATOMIC_STATE_FILE_CREATE is provided below, and depicted in FIG. 7, beginning with step 74.

| Step | Operation |
|---|---|
| 76 | Set status to VM_NORMAL. |
| 78 | Compute the required size for the atomic-state file based on the size of the object (allowing one entry per page in the object). |
| 80 | Spin-lock the object entry. |
| 82 | Issue a call to the operating system's file system to create an unnamed file (the atomic state file) for direct access, and store the new file's vnode in the object entry. |
| 84 | Call the file system to open the atomic state file for random access. |
| 86 | Call the file system to allocate physical disk blocks for the atomic state file. |
| 88 | Unlock the object entry. |
| 90 | Return. |

VM_ATOMIC_STATE_STORE

The virtual memory system executes the steps of procedure VM_ATOMIC_STATE_STORE to store atomic information corresponding to data in a page of an object. The procedure is executed after storing the page itself to the secondary storage file, when deleting it from the active object. The VM system provides as input to the procedure pointers to the object and current window, as well as the SVA system virtual address of the page and its atomic state. The procedure produces as output a signal indicating the status of the procedure execution.

Figure 8:
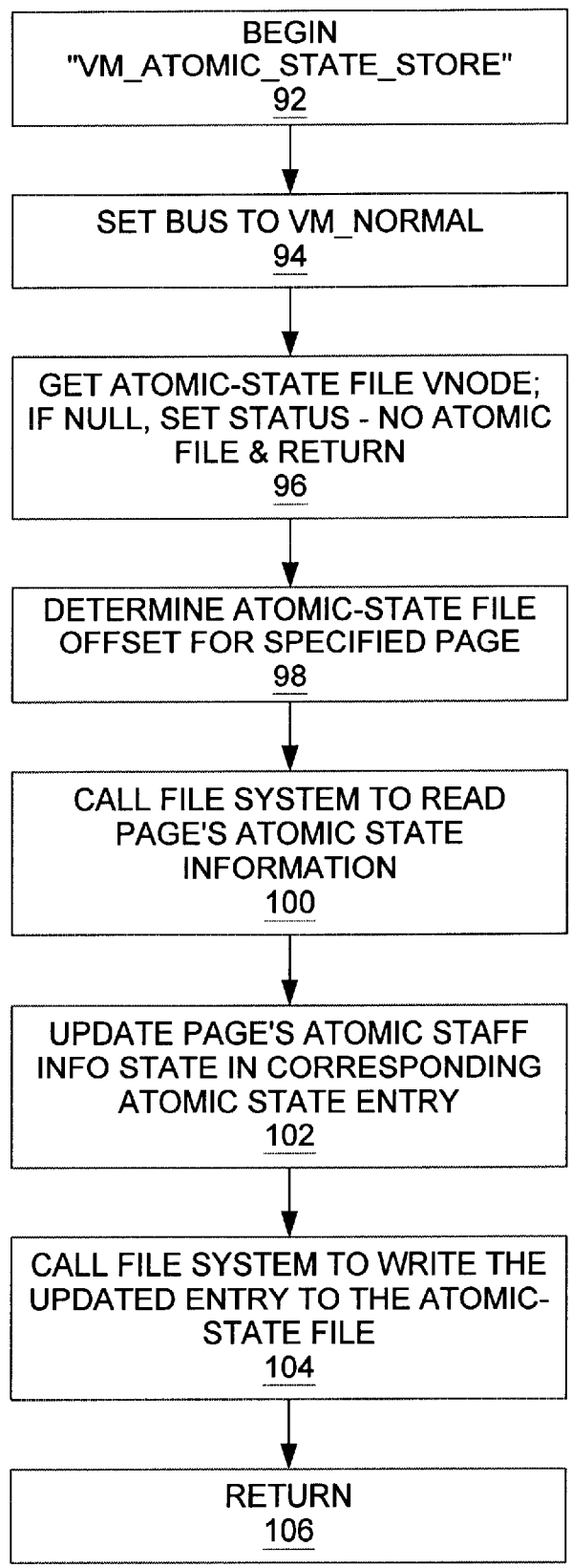

A preferred sequence of steps for VM_ATOMIC_STATE_STORE is provided below, and depicted in FIG. 8, beginning at step 92.

| Step | Operation |
|---|---|
| 94 | Set status to VM_NORMAL. |
| 96 | Get the atomic-state file's vnode from the object. If this is NULL, return the exception VM_NO_ATOMIC_ST ATE_FILE. |
| 98 | Use VM_ATOMIC_STATE_OFF_GET to determine an offset in the atomic-state file for the specified page's information. |
| 100 | Call the file system to read the page's atomic state information. |
| 102 | Update the page's atomic state information in the appropriate atomic state entry. |
| 104 | Call the file system to write the updated atomic state entry. |
| 106 | Return. |

VM_ATOMIC_STATE_GET

The virtual memory system executes the steps of procedure VM_ATOMIC_STATE_GET to get atomic information corresponding to data in a page of an object. The procedure is invoked when reading a previously accessed page from the secondary storage device. The VM system provides as input to the procedure pointers to the object and current window, as well as the SVA address of the page of interest. The procedure associates the atomic state with the object, and in addition provides the status of the retrieval operation. As noted above, when the object is in the atomic state it can only be accessed by the central processing unit that owns it, and all other cells are prohibited from accessing the object until it is released by its owner.

Figure 9:
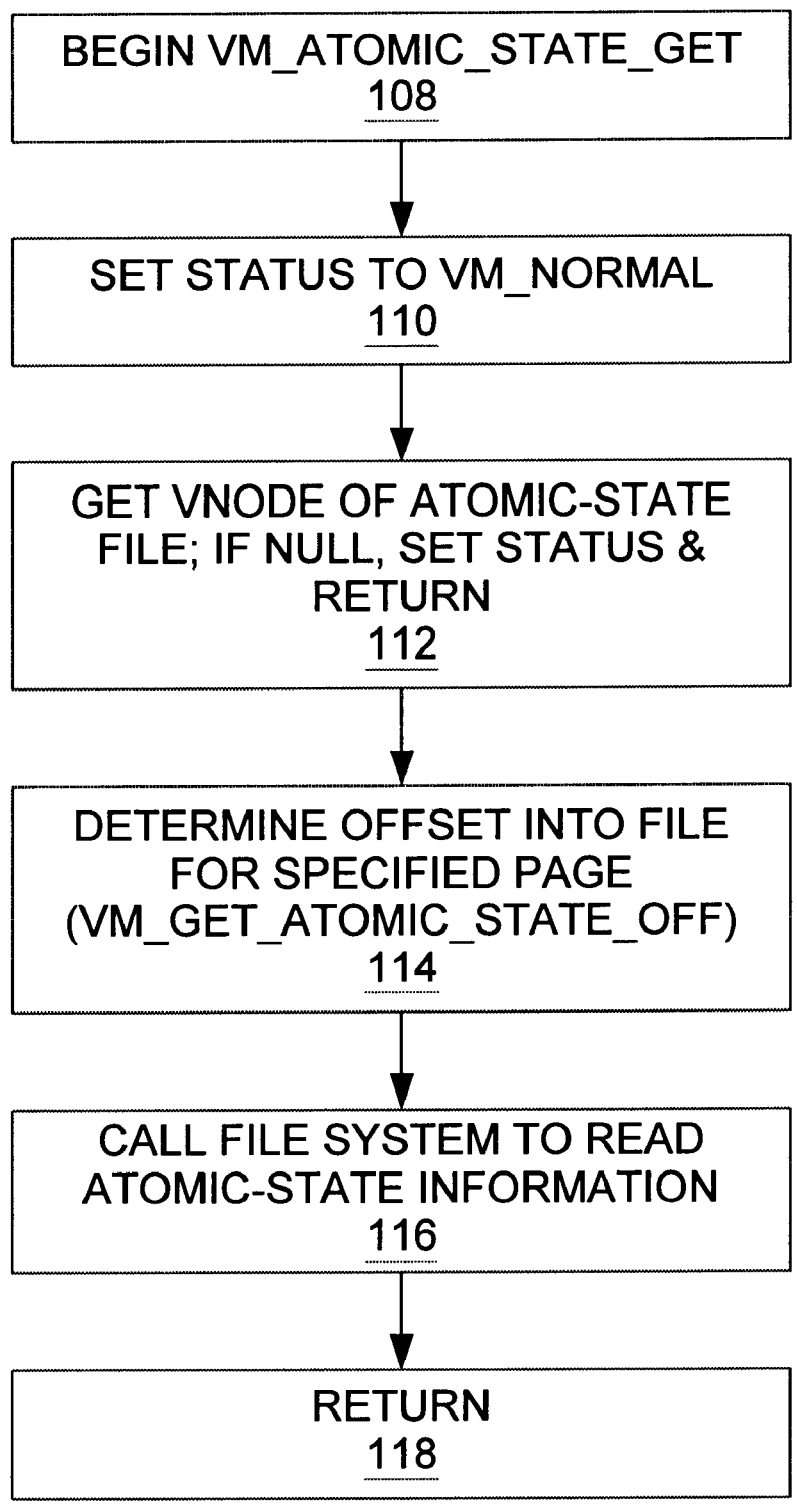

A preferred sequence of steps for VM_ATOMIC_STATE_GET is provided below, and depicted in FIG. 9, beginning at step 108.

| Step | Operation |
|---|---|
| 110 | Set status to VM_NORMAL. |
| 112 | Get the atomic-state file's vnode from the object. If this is NULL, return the exception VM_NO_ATOMIC_STATE_FILE. |
| 114 | Use VM_GET_ATOMIC_STATE_OFF to determine the offset in the atomic-state file for the specified page_s information. |
| 116 | Call the file system to read the pages atomic state information. |
| 118 | Return. |

VM_ATOMIC_STATE_FILE_DESTROY

The VM system invokes the procedure VM_ATOMIC_STATE_FILE_DESTROY to delete an atomic state file for an object, e.g., when caching the object. The procedure accepts as input a pointer to the object, and returns as output a status of the caching operation.

Figure 10:
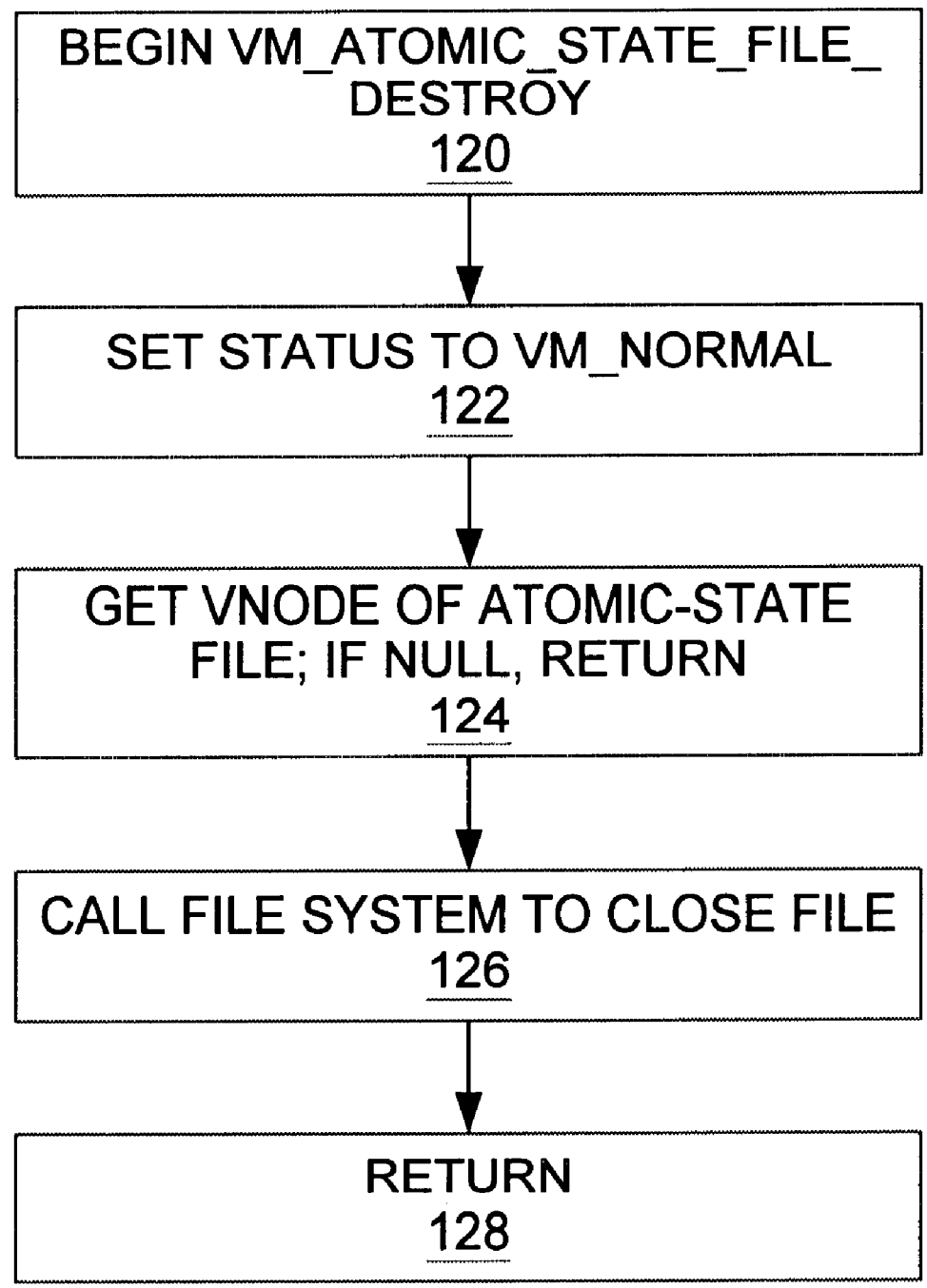

A preferred sequence of steps for VM_ATOMIC_STATE_FILE_DESTROY is provided below, and depicted in FIG. 10, beginning at step 120.

| Step | Operation |
|---|---|
| 122 | Set status to VM_NORMAL. |
| 124 | Get the atomic-state file's vnode from the object. If this is NULL, return. |
| 126 | Call the file system to close the file (this will cause it to be deleted). |
| 128 | Return |

VM_ATOMIC_STATE_OFF_GET

The steps of macro VM_ATOMIC_STATE_OFF_GET determine the offset into an atomic-state file for a specified page. These steps are called with pointers to the current object and window, as well as the SVA address of the page in issue. The macro returns the offset associated with that page.

A preferred sequence of steps for VM_ATOMIC_STATE_OFF_GET is provided below:

Determine the page-offset into the file for the specified page_address. This is (((page_address−window.base_sva)/bytes_per_page) +window.offset-in-file+object.offset_in-file).

Given the page-offset, determine the offset within the atomic state file for the block of data that contains the atomic state information for the page specified (page-offset * SIZEOF(vm_atomic_entry_t)).

Tracking Atomic Pages Within Windows

To speed paging, the VM system tracks the highest and lowest addresses within each vm_window for which atomic transactions are enabled. Those addresses are retained in the fields high_addr_atomic and low_addr_atomic within the vm_window data structure. By checking these values, the VM system can determine, for example, whether atomic transactions are permitted on a newly allocated page.

The window defined by high_addr_atomic and low_addr_atomic is updated by VM_FAULT PAGE_ACCESS. Particularly, whenever an executing processes attempts to make atomic a subpage that resides within a page for which descriptor.noatomic set, the memory system (e.g., control units 52A, 52B and 52C) signals an access-violation fault. This causes the trap handler to be invoked and, thereby, the operating system. Once invoked, the operating system executes steps within the procedure VM_FAULT_PAGE_ACCESS to determine whether the subpage can properly be taken atomic and, if so, to set high_addr_atomic and low_addr_atomic.

VM_FAULT_PAGE_ACCESS accepts as input the address of the page on which the access violation fault occurred and the access type of that page.

Figure 11:
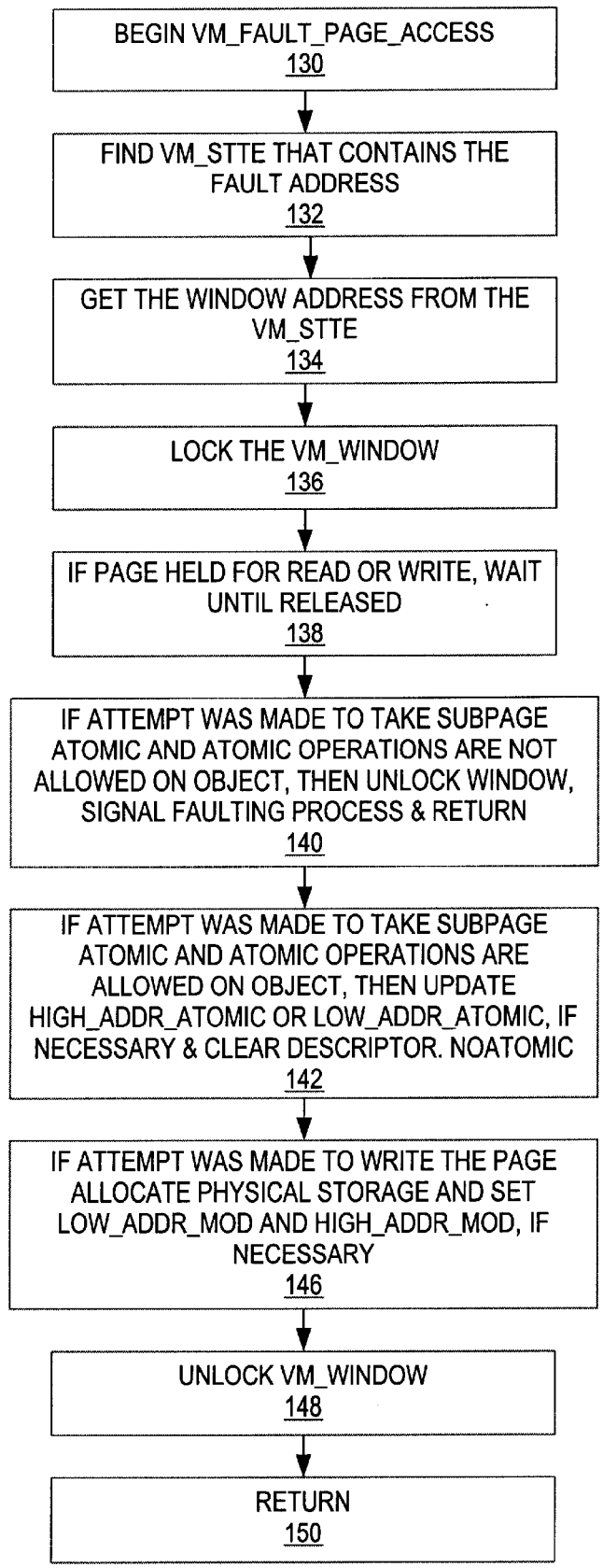
FIGS. 11–13 depict preferred steps executed by the multiprocessing system 10 in use of the procedures shown in FIGS. 7–10.

A. preferred sequence of steps for VM_FAULT_PAGE_ACCESS is provided below, and depicted in FIG. 11, beginning with step 130.

| Step | Operation |
|---|---|
| 132 | Find the vm_stte that contains the fault address. |
| 134 | Get the vm_window address from the vm_stte |
| 136 | Lock the vm_window for exclusive access. |
| 138 | If a page-note for fauiting pages indicates read-held or write-held, do:<br>A) Set the processes_waiting bit in the page-note.<br>B) Call sleep_hard_rsp to unlock the vm_window and wait on the page address.<br>C) When awakened, return. |
| 140 | If the attempt was to take a subpage atomic and atomic operations are not allowed for this object do:<br>i) Unlock the vm_window, |

-continued

| Step | Operation |
|---|---|
| | ii) Signal to the faulting process, and |
| | iii) Return. |
| 142 | If the attempt was to take a subpage atomic and atomic transactions are allowed on this object, then: |
| | i) Update the high_addr_atomi c or low_addr_atomic if needed, and |
| | ii) Clear the no-atomic bit in the page descriptor. |
| 146 | If the attempt was to write to the page do: |
| | A) If a page note exists and the zero_page bit is set, do: |
| | i) Call the file system to allocate physical storage for the page. |
| | ii) Clear the zero_page bit in the page note and free the note if it is empty. |
| | B) If fault_address is higher than window.high_addr_mod, then set window high addr_mod to fault_address. |
| | C) If fault_address is lower than window.low_addr_mod, then set window.low_addr mod to fault_address. |
| | D) Clear the no-write descriptor for the page. |
| 148 | Unlock the vm_window. |
| 150 | Return. |

When allocating a new page in the SVA, the VM system can set descriptor.noatomic to true, thereby forcing the system to invoke VM_FAULT_PAGE_ACCESS upon the first attempt to take any subpage atomic.

Preferably, however, upon allocating a new datum the VM system can set descriptor.noatomic in accordance with the values of window.atomic_enabled, window.high_addr_atomic and window.low_addr_atomic. Thus, if the SVA of a newly allocated datum resides within a window for which atomic transactions are allowed and, more particularly, between window.high_addr_atomic and window.low_addr_atomic, the VM system can set descriptor.noatomic to false (thereby, preventing a trap upon the first attempt to take a subpage atomic). Otherwise, the VM system can set descriptor.noatomic to true.

It will be appreciated that the processors of the system 10 generate requests for all allocations of new data both during execution user (or system) processes, as well as during paging of data from the secondary storage devices.

Use of the Atomic State File Procedures

In a preferred embodiment of the invention, the above-described atomic state file procedures are invoked at several points during system 10 operation, particularly, during mapped file opening and paging operations.

For example, the VM system executes the steps of procedure VM_ATOMIC_STATE_FILE_CREATE as part of the procedure VM_OBJ_MAP, when mapping a range of an object to a process. As indicated in the sequence of steps below, if the specified range falls within the range of an existing window, and if atomic transactions are enabled on that existing window, then VM_OBJ_MAP sets the atomic enabled flag for the new window. If the specified range is not within an existing window, the VM_OBJ_MAP sets the atomic enabled flag for the new window only if so specified by the calling routine.

Inputs to VM_OBJ_MAP include a pointer to the object, an offset and length within the object to be mapped, the current STT table, an access type, and a flag indicating whether atomic transactions are to be enabled for the new mapping (that is, if it does not already fall within an existing window). As a result of its operation, VM_OBJ_MAP produces a pointer to the window and STT for the newly mapped section, as well as a return status.

Figure 12:
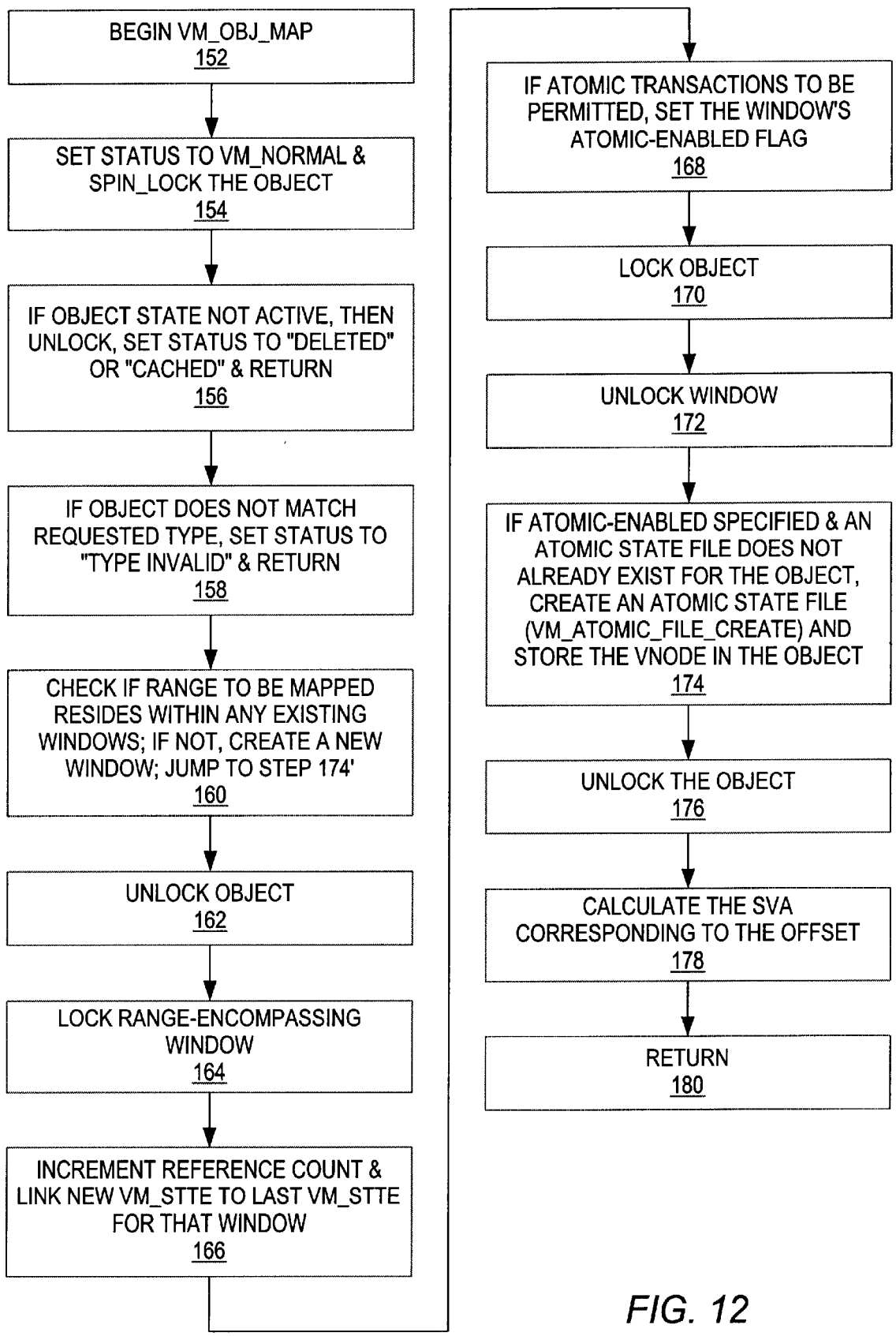

A preferred sequence of steps for VM_OBJ_MAP is provided below, and depicted in FIG. 12, beginning at step 152.

| Step | Operation |
|---|---|
| 154 | Set status to VM_NORMAL and lock the object for exclusive access. |
| 156 | If the object's state is anything other than active, do: |
| | A) Unlock the object. |
| | B) Return VM_OBJECT_DELETED or VM_OBJECT_CACHED, depending on the state. |
| 158 | If the object type does not match the requested type do: |
| | A) Unlock the object. |
| | B) Return the VM_OBJ_TYPE_INVALID exception. |
| 160 | Check if the range to be mapped in resides in any existing windows. If not, create a new window for the range to be mapped and jump to step 174. |
| 162 | Otherwise, unlock the object. |
| 164 | Lock the window. |
| 166 | Increment the reference count and link the new vm_stte to the last vm_stte for that window. |
| 168 | If atomic_enabled is specified (to enable atomic transactions for the window) set the window's atomic_enabled flag. |
| 170 | Lock the object. |
| 172 | Unlock the window. |
| 174 | If atomic_enabled was specified and an atomic state file does not exist for the object, call vm_atomic_state_file_create and store the vnode in the object entry. |

-continued

| Step | Operation |
|---|---|
| 176 | Unlock the object. |
| 178 | Calculate the SVA that corresponds to the object offset specified. |
| 180 | Return. |

Further use of the atomic state file procedures is made by the VM system when executing the steps of procedure

| Step | Operation |
|---|---|
| 184 | Make sure, that at least one of discard, flush, clear_atomic, or save_atomic is set. Also make sure that clear_atomic is not set if discard or save_atomic is set. If there is a problem return the exception VM_ILLEGAL_PARAMETERS. |
| 186 | Set status to VM_NORMAL. |
| 188 | Lock the window. |
| 190 | If atomic state (save_atornic or cIear_atomic) is specified do:<br>A) Set low_page to low_addr_atomic and high_page to high_addr_ato mic.<br>B) Clear low_addr_atomic and high_ad dr_atomic |
| 192 | If flush was specified do:<br>A) Set low_page to low_addr_mod and high_page to high_addr_mod.<br>B) Set low_addr_mod, high_addr_mod, low_addr_atomic, and high_add r_atomic to zero.<br>Otherwise, if discard was specified do:<br>A) Set low-page to low_addr_ref and high_page to high_addr_ref<br>B) Clear low_addr_ref, high_addr_ref to zero, low_addr_mod, high_ad dr mod, low_addr_atomic, and high_addr_atomic |
| 194 | Unlock the window entry to avoid a deadlock with the page hold and write routines. |
| 196 | For each page from low_addr to high_addr do: |
| 198 | Get the descriptor, if it exists. |
| 200 | If the page is not resident, jump to step 216. |
| 202 | Hold the page for write. |
| 204 | If the window has atomic_enabled set, and if save_atomic or clear_atomic are also set, read (get) the atomic state information for all the subpages. |
| 206 | If save_atomic is specified and the window has atomic_enabled set call vm_atomic_state store. |
| 208 | If clear_atomic is set and the window has atomic_enabled, do an RSP on each subpage that is in atomic state. |
| 210 | If flush is set, call vm_page_out to flush the page to its device. If discard is set, use VM_PAGE_DESCR_MOD to invalidate the page. |
| 212 | Call vm_page_release. |
| 214 | Return. |
| 216 | If discard_atomic was specified and the window has atomic_enabled and the page is within the range delimited by low_addr_atomic and high_addr_atomic, make sure the page does not have atomic state information in the atomic_state_file by calling VM_ATOMIC_STATE_STORE for the page with an empty entry. |
| 218 | Return. |

VM_ATOMIC_STATE_STORE to "clean" pages of a window using steps within the procedure VM_WINDOW_CLEAN_PAGES. This latter procedure ensures that all pages in a window are in a specified state. This can include flushing modified pages to disk, discarding resident pages, saving the atomic state of any pages that have at least one subpage in atomic or transient-atomic state, and ensuring that no pages in a window have any atomic state information associated with them.

The steps of VM_WINDOW_CLEAN_PAGES are executed by the VM system when syncing, caching or deleting a window. Inputs to the procedure include a pointer to the window to be cleaned, and Boolean values indicating whether the window is to be flushed or discarded. Inputs also include Boolean values indicating whether atomic state information for pages within the window are to be saved or cleared. The procedure returns a status value.

Figure 13:
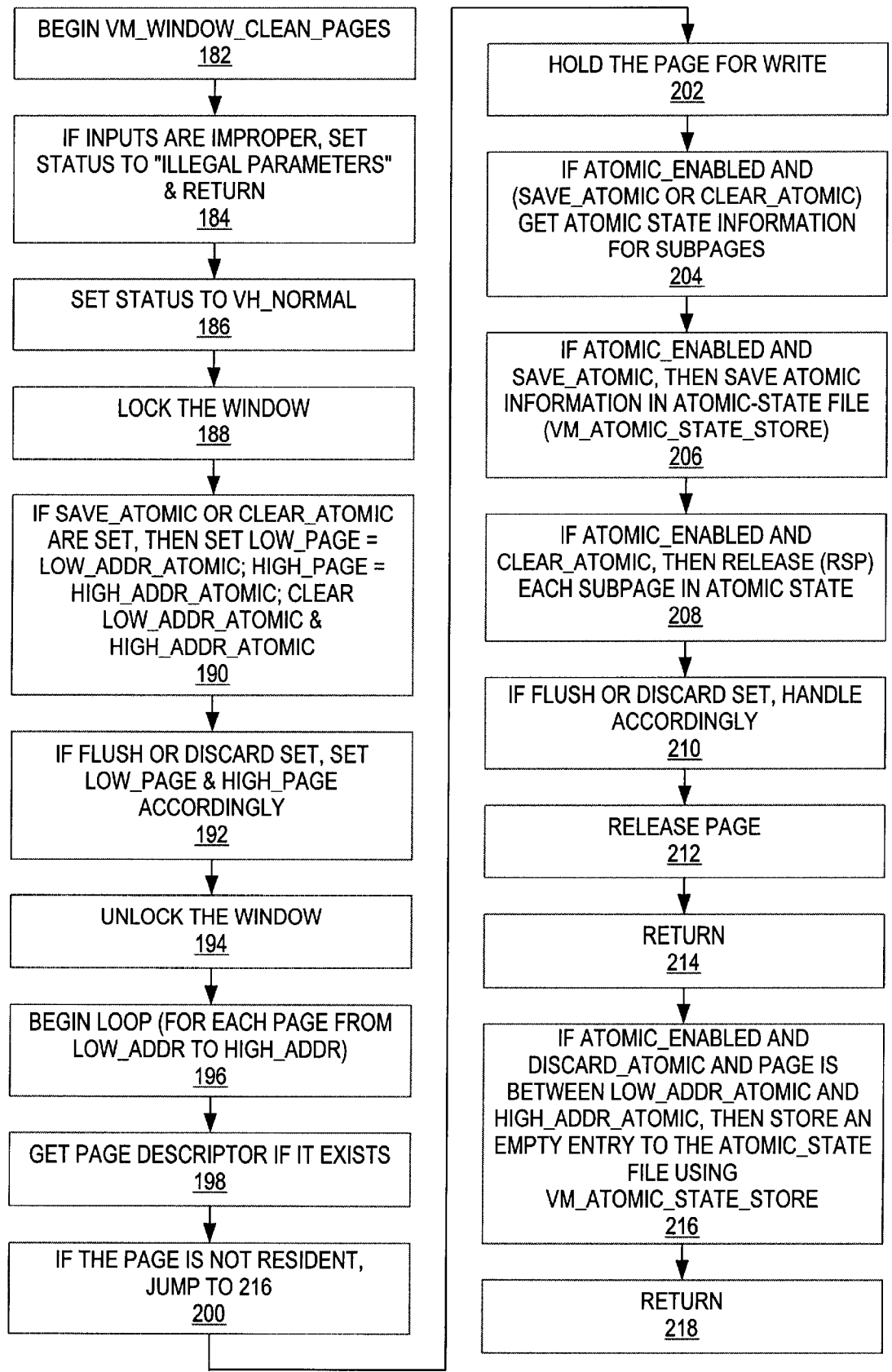

A preferred sequence of steps for VM_WINDOW_CLEAN_PAGES is provided below, and depicted in FIG. 13, beginning with step 182.

By way of further example, when the VM system moves an object from the list of active to cached objects, it invokes VM_ATOMIC_STATE_FILE_DESTROY. The system likewise invokes that same procedure upon deleting an object, e.g., a temporary file or a cached object, to free a vnode.

Also, in reading a page from a mapped file, the VM system must read the corresponding atomic state file, if any, to determine whether that page is in atomic state. This is accomplished by invoking VM_ATOMIC_STATE_GET with the object, window and SVA address of the page. If an atomic state entry corresponding to the page is found, VM_ATOMIC_STATE_STORE is invoked to store an empty entry at the same location in the atomic state file, thereby clearing the entry for future use.

If the information from the atomic state file indicates that any subpage in the page is atomic, the VM system modifies the descriptor accordingly. Preferably, the VM system does this by calling the memory system's subpage atomic state instruction gsp.wt for each required subpage. As evident above, this is the same instruction that processes themselves execute in order to set subpages atomic.

In writing a page to a mapped file, the VM system must also store the atomic information to the corresponding atomic state file, if any. This is accomplished by determining whether atomic transactions are enabled at the time the page is written out. If so, the VM system gets atomic state information from the page descriptor. If any of the subpages are atomic, the VM system executes VM_ATOMIC_STATE_STORE to write-out the atomic information.

Summary

The foregoing describes an improved digital data processing system meeting the aforementioned objects. Particularly, it describes a digital data processing system that pages data, as well as out-of-band data relating to it. Those skilled in the art will appreciate that the embodiments described above are exemplary only, and that other apparatuses and methods—including modifications, additions and deletions—fall within the scope and spirit of the invention.

By way of example, it will be appreciated that differing data structures may be used for storing the out-of-band data, e.g., the atomic state information. In addition, a variety of diverse procedures may be used to transfer the atomic state information to-and-from the secondary storage devices. And, by way of further example, the sequence of at least some of the ones of the paging operations may be varied without changing the spirit of the invention.

In view of the foregoing, what we claim is:

1. A digital data processing apparatus comprising:
    A. a primary data store for storing data for access by a process, said primary data store storing data in at least one storage location set, said at least one storage location set including at least one storage location subset;
    B. a secondary data store for storing data in at least one data file;
    C. a paging control coupled to said primary data store and said secondary data store for selectively transferring data between said storage location set in said primary data store and said data file, the paging means including:
        i. a directory for storing at least one atomic attribute indicator, each atomic attribute indicator being associated with a said storage location set and indicative of an attribute of the data stored therein, and
        ii. a page-out control for controlling transfer of data from a storage location subset of said storage location set to said associated data file, said page-out control including an atomic attribute indicator store control for, in response to the atomic attribute indicator associated with data in at least said storage location subset, storing to an associated status file on said secondary data store an attribute indicator associated with data in said storage location subset and indicative of said attribute.

2. A digital data processing apparatus according to claim 1, wherein said page-out control includes a status file control store responsive to a preexisting status file on said secondary data store associated with said storage location set for storing to that associated status file an attribute indicator associated with data in said storage location subset and indicative of said attribute.

3. A digital data processing apparatus according to claim 1, wherein said page-out control includes a atomic attribute indicator store control for storing, as said attribute indicator, the atomic attribute indicator associated with data in said storage location subset.

4. A data processing apparatus according to claim 1, wherein said apparatus includes a file system, wherein further said page-out control includes status file creation control for enabling said file system to create said status file if said status file does not exist, said status file creatin control enabling said file system to create said status file substantially concurrently with the storage of data from said storage location subset to said data file.

5. A digital data processing apparatus according to claim 1 including a plurality of processes, wherein said atomic attribute indicator is indicative of a storage location containing data for which access is permitted by selected ones of said plurality of processes.

6. A digital data processing apparatus according to claim 1, wherein said apparatus operates under a UNIX operating system.

7. A digital data processing apparatus according to claim 1, each storage location has an associated address, said digital data processing apparatus further comprising a window address tracker for tracking a range of said addresses associated with data of said storage location set for which said attribute has been changed by at least one process.

8. A digital data processing apparatus according to claim 7, wherein said window address tracker includes means for storing at least one of a minimum address and a maximum address associated with storage locations for which said attribute has been changed said process.

9. A digital data processing apparatus according to claim 8, wherein
    A. said process includes an allocation request signal generator for generating an allocation request requesting allocation of a new storage location in said storage location set,
    B. a memory management controller responsive to said allocation request signal for allocating the new storage location in said storage location set, said memory management controller including-an attribute disassociator which, in response to an address associated with said storage location being allocated which is not between said minimum address and said maximum address, at least temporarily disassociates the storage location's attribute and the new storage location;
    C. said process includes a GET signal generator for generating a GET indication for effecting association of a said attribute with the new storage location;
    D. said memory management controller is responsive to said GET signal and to said temporary disassociation for
        i) generating a trap signal,
        ii) enabling association of said attribute with that storage location and
        iii) associating said attribute with the new storage location; and
    E. said window address tracker is responsive to said trap signal for selectively changing one of said minimum address and said maximum address in accord with the address of the new storage location.

10. A digital data processing apparatus according to claim 9 wherein said memory management controller includes an attribute association enabler responsive to an allocation request for a new storage location having an address between said minimum address and said maximum address for enabling association of said attribute to the new storage location.

11. A digital data processing apparatus according to claim 8, wherein said atomic attribute indicator store control stores a corresponding attribute indicator to said status file only for a storage location whose address is between said minimum and maximum addresses.

12. A digital data processing apparatus according to claim 11, wherein said paging control further comprises a page-in control for restoring data to said storage location set of said primary data store from the data file, said page-in control responding to the attomic attribute indicator for associating the atomic attribute indicator associated with the restored data with the storage location set in which the data is restored.

13. A digital data processing apparatus according to claim 12, wherein each said storage location is associated with an address, and wherein said apparatus further comprises a window address tracker for tracking a range of said addresses associated with storage locations for which said attribute has been changed by said process.

14. A digital data processing apparatus according to claim 13, wherein said page-in control generates a GET signal along with a descriptor of a storage location containing restored data, the digital data processing apparatus further comprising a memory management controller responsive to the GET signal and the descriptor for associating the storage location associated with the descriptor with said atomic attribute indicator.

15. A digital data processing apparatus according to claim 14, wherein said window address tracker tracks at least one of a minimum address and a maximum address associated with a data for which said attribute has been changed by said process.

16. A digital data processing apparatus according to claim 15, wherein said page-in controller includes, in response only to an attribute indicator associated with data having an address between said minimum address and said maximum address, associates said atomic attribute indicator with the storage location containing said data item upon restoring to said storage location set.

17. A digital data processing apparatus according to claim 15, further comprising
  A. a memory management control responsive to an address associated with data restored to said storage location set which address is not between said minimum address and said maximum address for at least temporarily disassociating said attribute from the storage location set towhich the data is restored;
  B. said memory management control including means responsive to said GET signal and to said temporary disabling of association for
    i) generating a trap signal,
    ii) enabling association of the attribute associated with the restored data to the storage location set to which the restored data is restored, and
    iii) associating said attribute associated with the restored data to the storage location set in which the restored data is restored; and
  C. said window address tracker being responsive to said trap signal for selectively changing one of said minimum address and saidmaximum address in accord with the address of storage location set to which the data is restored.

18. A digital data processing apparatus according to claim 17, wherein said memory management controller includes an attribute assocation enabler responsive to an address associated with data restored to said storage location set between said minimum address and said maximum address for enabling association of said attribute to that storage location.

19. A method of operating a digital data processing apparatus having primary data store for storing data for access by a process, said primary data store storing data in at least one storage location set, said at least one storage location set including at least one storage location subset, a secondary data store for storing data in at least one data file, and a paging control coupled to said primary data store and to said secondary data store for selectively transferring data between at least said storage location set of data in said primary data store and said file, said method comprising the steps of:
  A. storing at least one an atomic attribute indicator, each associated with data in said storage location set and indicative of an attribute thereof,
  B. storing data from said storage location subset of said storage location set to the data file, and
  C. responding to an atomic attribute indicator associated with one or more data in at least said storage location subset for storing to an associated status file on said secondary data store an attribute indicator associated with data in said storage location subset and representative of said attribute thereof.

20. A method according to claim 19 for use in connection with apparatus including a plurality of processes, the method further comprising the step of storing an atomic attribute indicators indicative of a a storage location containing data for which access is permitted by selected ones of said plurality of processes.

21. A method according to claim 19, further comprising the step of operating said apparatus under a UNIX operating system.

22. A method according to claim 19, further comprising the step of storing, as said attribute indicator, the atomic attribute indicators associated with said data in said storage location subset.

23. A method according to claim 22, wherein said apparatus includes a file system, the method further comprising the step of enabling said file system to create a status file if no status file exists for the storage location subset.

24. A method according to claim 22, wherein each storage location in said storage location set is associated with an address, the further improvement comprising the step of tracking a range of said addresses associated with said storage location set for which said attribute has been changed by at least one process.

25. A method according to claim 24, further comprising the steps of tracking at least one of a minimum address and a maximum address associated with storage locations of said storage location set for which said attribute has been changed by said process.

26. A method according to claim 25, further comprising the step of, if a storage location has an address between said minimum address and said maximum address, storing an associated therewith for storing an attribute indicator corresponding to the atomic attribute indicator to said status file.

27. A method according to claim 25, further comprising the steps of
  A. generating a signal representative of a request for allocation of a new storage location in said storage location set,
  B. in response to an allocation request, allocating said new storage location in said storage location set, and if the address associated with storage location is not between said minimum and maximum values, disassociating said attribute therewith,
  C. generating a GET signal for effecting association of said attribute with said new storage location;

D. in response to said GET signal and to said disassociation for
  i) generating a trap signal,
  ii) enabling association of said attribute with said new storage location,
  iii) associating said attribute with said new storage location; and
E. responding to said trap signal for selectively changing one of said minimum address and aid maximum address in accord with the address of that storage location.

28. A method according to claim 27, further comprising the step of responding to an alloation request for a new storage location having an address between said minimum address and said maximum address for associating said attribute to the new storage location.

29. A method according to claim 19, further comprising the step of, if a status file associated with said storage location set exists on said secondary data store, storing to that associated status file an attribute indicator associated with data in said storage location subset and indicative of said attribute.

30. A method according to claim 29, further comprising the steps of
  A. restoring data to said storage location set of said primary data store from the associated data file,
  B. providing an atomic attribute indicator for storage locations of said storage location set associated with said attribute indicator.

31. A method according to claim 30, further comprising the steps of
  A. normally responding to a GET signal and a descriptor signal of a storage location for associating that storage location with said atomic attribute indicator,
  B. generating such a GET signal, along with a descriptor of a storage location associated with said attribute indicator restored to said primary data store from said secondary data store, in connection with restoring data from a storage location associated with said attribute indicator to said storage location set of said primary data store from the associated data file.

32. A method according to claim 31, wherein each said storage location is associated with an address, the method further comprising the step of tracking a range of said addresses associated with storage locations for which said attribute has been changed by said process.

33. A method according to claim 32, further comprising the step of tracking at least one of a minimum address and a maximum address associated with a storage location for which said attribute has been changed said process.

34. A method according to claim 33, further comprising the steps of
  A. for an address associated with a storage location in said storage location set which address is not between said minimum address and said maximum address, dissociating said attribute from that storage location,
  B . responding to said GET signal and to said dissociation for
    i) generating a trap signal,
    ii) enabling association of said attribute to that storage location, and
    iii) associating said attribute to that storage location,
  C. in response to said trap signal selectively changing one of said minimum address and said maximum address in accord with the address of that storage location.

35. A method according to claim 34, further comprising the step of, in response to an address associated with a storage location between said minimum address and maximum address, associating said attribute to that storage location.

36. A method according to claim 35, further comprising the step of in response only to an attribute indicator associated with data having an address between said minimum address and said maximum address, associating said atomic attribute indicator with the storage location containing said data item upon restoring to said storage location set.

* * * * *